(12) United States Patent
Kawamura et al.

(10) Patent No.: US 8,478,587 B2
(45) Date of Patent: Jul. 2, 2013

(54) VOICE ANALYSIS DEVICE, VOICE ANALYSIS METHOD, VOICE ANALYSIS PROGRAM, AND SYSTEM INTEGRATION CIRCUIT

(75) Inventors: Takashi Kawamura, Kyoto (JP); Ryouichi Kawanishi, Osaka (JP)

(73) Assignee: Panasonic Corporation, Osaka (JP)

( * ) Notice: Subject to any disclaimer, the term of this patent is extended or adjusted under 35 U.S.C. 154(b) by 978 days.

(21) Appl. No.: 12/529,084

(22) PCT Filed: Mar. 13, 2008

(86) PCT No.: PCT/JP2008/000556
§ 371 (c)(1),
(2), (4) Date: Aug. 28, 2009

(87) PCT Pub. No.: WO2008/126347
PCT Pub. Date: Oct. 23, 2008

(65) Prior Publication Data
US 2010/0094633 A1      Apr. 15, 2010

(30) Foreign Application Priority Data
Mar. 16, 2007   (JP) ................ 2007-069478

(51) Int. Cl.
*G10L 21/02* (2006.01)
*G10L 15/20* (2006.01)
*G10L 19/00* (2006.01)
*G10L 11/06* (2006.01)
*G10L 15/06* (2006.01)
*G10L 13/06* (2006.01)
*G10L 21/00* (2006.01)
*G10L 15/00* (2006.01)

(52) U.S. Cl.
USPC ........... 704/226; 704/223; 704/213; 704/214; 704/245; 704/268; 704/270; 704/270.1; 704/275; 704/273; 704/227; 704/240; 704/234; 704/218; 704/231; 704/243; 704/241; 704/210

(58) Field of Classification Search
USPC ................. 704/233, 213, 214, 245, 268, 278, 704/270, 270.1, 275, 273, 226, 227, 240, 704/234, 218, 231, 243, 241, 210
See application file for complete search history.

(56) References Cited

U.S. PATENT DOCUMENTS

| | | | | |
|---|---|---|---|---|
| 5,737,433 A * | 4/1998 | Gardner | | 381/94.7 |
| 5,819,223 A | 10/1998 | Takagi | | |
| 6,710,822 B1 * | 3/2004 | Walker et al. | | 348/722 |
| 6,862,359 B2 * | 3/2005 | Nordqvist et al. | | 381/312 |
| 6,990,443 B1 | 1/2006 | Abe et al. | | |
| 7,912,230 B2 * | 3/2011 | Kawamura et al. | | 381/93 |
| 2001/0001141 A1 * | 5/2001 | Sih et al. | | 704/231 |
| 2001/0044719 A1 | 11/2001 | Casey | | |
| 2003/0033143 A1 * | 2/2003 | Aronowitz | | 704/233 |
| 2004/0167767 A1 | 8/2004 | Xiong et al. | | |
| 2005/0071157 A1 * | 3/2005 | Droppo et al. | | 704/226 |
| 2005/0080623 A1 * | 4/2005 | Furui et al. | | 704/233 |
| 2006/0140413 A1 | 6/2006 | Abe et al. | | |
| 2007/0154872 A1 * | 7/2007 | Sako et al. | | 434/247 |
| 2007/0250777 A1 * | 10/2007 | Chen et al. | | 715/723 |
| 2008/0154595 A1 * | 6/2008 | Nelken | | 704/240 |
| 2008/0167872 A1 * | 7/2008 | Okimoto et al. | | 704/251 |
| 2010/0027820 A1 * | 2/2010 | Kates | | 381/312 |

FOREIGN PATENT DOCUMENTS

| | | |
|---|---|---|
| EP | 1 100 073 | 5/2001 |
| EP | 1 260 968 | 11/2002 |
| EP | 1 708 101 | 10/2006 |
| EP | 1 732 063 | 12/2006 |
| JP | 8-202385 | 8/1996 |
| JP | 2000-66691 | 3/2000 |
| JP | 2000-66698 | 3/2000 |
| JP | 2000-209143 | 7/2000 |
| JP | 2001-142480 | 5/2001 |
| JP | 2002-91480 | 3/2002 |
| JP | 2002-142189 | 5/2002 |
| JP | 2003-15684 | 1/2003 |
| JP | 2003-177781 | 6/2003 |
| JP | 2004-15571 | 1/2004 |
| JP | 3565228 | 6/2004 |
| JP | 2004-236245 | 8/2004 |
| JP | 2004-258659 | 9/2004 |

| | | |
|---|---|---|
| JP | 3607450 | 10/2004 |
| JP | 4000171 | 8/2007 |
| WO | 2005/098820 | 10/2005 |

OTHER PUBLICATIONS

D. Tjondronegoro, Y.-P.P. Chen, and B. Pham, "Sports Video Summarization Using Highlights and Play-Breaks," Proc. ACM SIGMM Int'l Workshop Multimedia Information Retrieval, ACM Press, 2003, pp. 201-208.*

Supplementary European Search Report issued Dec. 20, 2010 in European Patent Application No. 08 72 0442.

Michael Buchler et al., "Sound Classification in Hearing Aids Inspired by Auditory Scene Analysis", Eurasip Journal on Applied Signal Processing Hindawi, vol. 2005, No. 18, pp. 2991-3002, XP 002610407, Oct. 15, 2005.

Brian Clarkson et al., "Extracting Context from Environmental Audio", Wearable Computers, Digest of Papers. Second International Sympo Sium on Pittsburgh, PA pp. 154-155, XP010312837, Oct. 19-20, 1998.

International Search Report issued Jun. 17, 2008 in International (PCT) Application No. PCT/JP2008/000556, filed Mar. 13, 2008.

Shimura, S. et al., *A study of a method for presenting experiential images detectable by behavioral context, The National Convention of Information Processing Society of Japan*, vol. 3 (2006).

Shimura, S. et al., *Experience Movie Presentation Method Using Action Situation Query, Department of Systems and Social Informatics*, Graduate School of Informaton Science Nagoya University Information Technology Center, Nagoya University (together with verified English translation), S. Shimura, Y. Hirano, S Kajita and K Mase, "Experience Movie Presentation Method Using Action Situation Query",Proc.68th National Convention of IPSJ, 2006, vol. 3.

* cited by examiner

*Primary Examiner* — Edgar Guerra-Erazo

(74) *Attorney, Agent, or Firm* — Wenderoth, Lind & Ponack, L.L.P.

(57) ABSTRACT

A sound analysis device comprises: a sound parameter calculation unit operable to acquire an audio signal and calculate a sound parameter for each of partial audio signals, the partial audio signals each being the acquired audio signal in a unit of time; a category determination unit operable to determine, from among a plurality of environmental sound categories, which environmental sound category each of the partial audio signals belongs to, based on a corresponding one of the calculated sound parameters; a section setting unit operable to sequentially set judgement target sections on a time axis as time elapses, each of the judgment target sections including two or more of the units of time, the two or more of the units of time being consecutive; and an environment judgment unit operable to judge, based on a number of partial audio signals in each environmental sound category determined in at least a most recent judgment target section, an environment that surrounds the sound analysis device in at least the most recent judgment target section.

11 Claims, 21 Drawing Sheets

FIG. 3

| Time | Category |
|---|---|
| $t_1 \sim t_2$ | Category 1 |
| $t_2 \sim t_3$ | Category 1 |
| ⋮ | ⋮ |
| $t_{m-1} \sim t_m$ | Category 2 |

VOICE ANALYSIS DEVICE, VOICE ANALYSIS METHOD, VOICE ANALYSIS PROGRAM, AND SYSTEM INTEGRATION CIRCUIT

TECHNICAL FIELD

The present invention relates to a sound analysis device for judging an environment surrounding the sound analysis device based on an audio signal in a mobile terminal, and in particular to a technique for improving the accuracy of judging the environment.

BACKGROUND ART

As a sound analysis technique, a mobile communication terminal device disclosed in the below-described Patent Document 1 is conventionally known. This mobile communication terminal device judges, for example, whether a user of the terminal is on a train or in a car, by comparing an environmental noise collected from a microphone to an environmental noise sample that has been registered with the internal portion of the terminal in advance. Then, upon receipt of a telephone call, the mobile communication terminal device plays a response message corresponding to the judgment result.

Also, the below-described Patent Document 2 discloses a call transmission regulation control system for a mobile terminal. This call transmission regulation control system registers a traffic noise with the internal portion of the terminal in advance, and automatically performs a call transmission control if a collected noise matches the registered traffic noise.

Furthermore, the below-described Non-Patent Document 1 discloses a technique for analyzing a sound collected by a wearable device, modeling the behavior of a user, and judging whether the user is working at his/her desk or in a meeting, based on a result of identifying sounds (identifying the typing sound of a keyboard, the flipping sound of paper sheets, and the voices).

The above-described techniques are based on sounds in a living environment. In these techniques, specific individual sounds are identified or classified so as to use applications such as an application for a response message and an application for call transmission regulations and judge a specific situation.

The other prior art documents are described in Patent Documents 3 to 8, which are listed below.
Patent Document 1: Japanese Patent Application Publication No. 2000-209143
Patent Document 2: Japanese Patent Application Publication No. 2004-15571
Patent Document 3: Japanese Patent No. 3607450
Patent Document 4: Japanese Patent No. 3565228
Patent Document 5: Japanese Patent Application Publication No. 2002-142189
Patent Document 6: Japanese Patent Application Publication No. 2000-66691
Patent Document 7: Japanese Patent Application Publication No. 2004-258659
Patent Document 8: Japanese Patent No. 4000171
Non-Patent Document 1: The National Convention of Information Processing Society of Japan in 2006, Vo. 3 "A study of a method for presenting experiential images detectable by behavioral context".

SUMMARY OF THE INVENTION

The Problems the Invention is Going to Solve

The above-described conventional techniques are applied to the technical field of mobile terminals, and realize functions for changing a response message according to an environment and imposing call transmission regulations.

However, in some situations, a noise may be mixed in sounds collected by a mobile terminal, which makes it difficult to judge the surrounding environment accurately. As a result, the mobile terminal cannot achieve the above-described function. For example, assume that a mobile terminal is used in a place where call transmission regulations should be imposed, such as in a car or in a public facility. In this case, although it is necessary to impose the regulations in such a place, if sounds collected by the mobile terminal include conversations, the collected sounds may not match with predetermined patterns, resulting in judgment of an environment not being performed accurately. When the judgment is not accurate, the mobile terminal may make a ringing sound although the user is in a car. Also, since a caller is not informed of the situation of the user appropriately, the caller may be frustrated by redialing repeatedly. It is also possible that the driver is distracted by the repeated incoming calls and ends up having a traffic accident.

An object of the present invention is to provide a sound analysis device that improves the accuracy of judgment of an environment.

Means to Solve the Problems

The present invention provides a sound analysis device comprising: a sound parameter calculation unit operable to acquire an audio signal and calculate a sound parameter for each of partial audio signals, the partial audio signals each being the acquired audio signal in a unit of time; a category determination unit operable to determine, from among a plurality of environmental sound categories, which environmental sound category each of the partial audio signals belongs to, based on a corresponding one of the calculated sound parameters; a section setting unit operable to sequentially set judgement target sections on a time axis as time elapses, each of the judgment target sections including two or more of the units of time, the two or more of the units of time being consecutive; and an environment judgment unit operable to judge, based on a number of partial audio signals in each environmental sound category determined in at least a most recent judgment target section, an environment that surrounds the sound analysis device in at least the most recent judgment target section.

Effects of the Invention

With the stated structure, the sound analysis device of the present invention determines, from among the plurality of environmental sound categories, which environmental sound category each of the partial audio signals belongs to, based on a corresponding one of the calculated sound parameters. Then, based on the number of partial audio signals in each environmental sound category determined in a judgment target section including two or more consecutive units of time, the sound analysis device judges an environment that surrounds the sound analysis device in the judgment target section. As a result, even if a partial audio signal in a unit of time is a noise such as a conversation, the environment is appropriately judged based on the number of partial audio signals in each environmental sound category determined in a judgment target section. In other words, even if a part of the judgment target section includes a noise such as a conversation, an environment is judged based on the number of partial audio signals in each environmental sound category determined in other parts in the judgment target section. This increases robustness with respect to judgment of an environment.

Here, the environment judgment unit may include a calculation unit operable to calculate category occupancies based on a number of partial audio signals in each environmental sound category determined in the most recent judgment target section, each of the category occupancies indicating a percentage of occupancy of a different one of the environmental sound categories in the most recent judgment target section, and the judgment of the environment based on the number of partial audio signals in each environmental sound category determined in the most recent judgment target section may be performed by determining an environmental sound category having a highest category occupancy among the category occupancies.

This makes it possible to judge an environmental sound category having the highest category occupancy among the category occupancies in the most recent judgment target section to be the environment in the most recent judgment target section. As a result, even if a part of a judgment target section includes a noise such as a conversation, an environmental sound category having the highest category occupancy in the judgment target section is judged to be the environment in the judgment target section. This improves the accuracy of judgment of an environment.

Here, the environment judgment unit may include a calculation unit operable to calculate, for each of the judgment target sections, category occupancies each indicating a percentage of occupancy of a different one of environmental sound categories in the judgment target section, and the judgment of the environment based on the number of partial audio signals in each environmental sound category determined in at least the most recent judgment target section may be performed by determining whether or not a rate of change between (i) category occupancies in the most recent judgment target section and (ii) category occupancies in a preceding judgment target section is greater than a predetermined threshold value.

With the stated structure, the environment in the most recent judgment target section is judged based on the rate of change between the category occupancies in the most recent judgment target section and the category occupancies in the preceding judgment target section.

Assume here, for example, that "bus" is an environmental sound category having the highest category occupancy in the preceding judgment target section, and "indoors" is an environmental category having the highest category occupancy in the most recent judgment target section due to the sound of an air-conditioner in the bus. Even in such a case, the environment in the most recent judgment target section is judged to be the "bus" if the rate of change in category occupancies is smaller than the threshold value. This makes it possible to improve the accuracy of judgment of an environment.

Note that the environmental category to which the sound of an air-conditioner belongs is assumed to be "indoors".

Here, the sound analysis device may further comprise: a power spectrum calculation unit operable to calculate a power spectrum of the audio signal; and a displacement judgment unit operable to detect temporal displacement of the power spectrum calculated by the power spectrum calculation unit and judge whether or not a value of the detected temporal displacement is greater than a predetermined threshold value, wherein the section setting unit may set the judgment target sections such that (i) a first time point at which the displacement judgment unit has judged affirmatively is an endpoint of a preceding judgment target section as well as a start point of the most recent judgment target section and (ii) a second time point at which the displacement judgment unit judges affirmatively next is an endpoint of the most recent judgment target section as well as a start point of a judgment target section subsequent to the most recent judgment target section.

This makes it possible to set the start point and end point of a judgment target section based on the temporal displacement of the power spectrum of the audio signal. Since a judgment target section in which an environment is assumed to be monotonous is set in advance, and then the environment in the judgment target section is judged based on the number of partial audio signals in each environmental sound category determined in the judgment target section, the accuracy of judgment of an environment is improved.

Here, the preceding judgment target section and the most recent judgment target section that are set by the section setting unit may partially overlap each other, and the environment judgment unit may further detect, when the rate of change is greater than the predetermined threshold value, a predetermined time point of either the most recent judgment target section or the preceding judgment target section, and set the predetermined time point as a time point at which the environment is changed.

In a case where the two judgment target sections do not partially overlap each other, an environment can be only judged at a boundary between the preceding judgment target section and the most recent judgment target section even if the environment is actually changed at some point in the preceding judgment target section. In the present invention, however, the two judgment target sections partially overlap each other, which makes it possible to detect the predetermined time point of the most recent judgment target section or the preceding judgment target section and sets the predetermined time point as the time point at which the environment is changed. Therefore, a time point at which an environment is changed can be more accurately detected.

Also, since the two judgment target sections partially overlap each other, real-time ability with respect to judgment of an environment is improved.

Furthermore, if an environment is judged and determined that the environment is changed, a time point at which the environment is changed is detected. This makes it possible, for example, to use applications suitable to the environment.

Here, the sound analysis device may further comprise: a movement detection unit operable to detect movement information indicating a movement of a user of the sound analysis device; a movement judgment unit operable to judge whether or not the user is moving based on the movement information; and a control unit operable to prevent the environment judgment unit from judging the environment when the movement judgment unit judges negatively, and permit the environment judgment unit to judge the environment when the movement judgment unit judges affirmatively.

With the stated structure, judgment of the environment by the environment judgment unit is permitted in a section in which the user is judged to be moving by the movement judgment unit. Based on the premise that an environment does not change without a movement of the user, judgment of an environment is not performed in a section that is judged by the movement judgment unit that the user is not moving. This improves accuracy of judgment of an environment and also improves calculation efficiency.

Here, each of the environmental sound categories may be related to transportation, and the sound analysis device may further comprise: a movement detection unit operable to detect movement information indicating a movement of a user of the sound analysis device; and a selection unit operable to select, from among the plurality of environmental sound categories, at least one environmental sound category as a candidate for transportation of the user, based on the movement information detected by the movement detection unit, wherein in a case where the at least one environmental sound category selected by the selection unit is changed between the most recent judgment target section and the preceding judgment target section, the environment judgment unit may further detect the predetermined time point as the time point at which the environment is changed.

Also, each of the environmental sound categories may be related to transportation, and the sound analysis device may further comprise: a position information detection unit operable to detect position information indicating a position of a user of the sound analysis device; a storage unit storing therein map information; and a selection unit operable to select, from among the plurality of environmental sound categories, at least one environmental sound category as a candidate for transportation of the user, based on the position information detected by the position information detection unit and the map information, wherein in a case where the at least one environmental sound category selected by the selection unit is changed between the most recent judgment target section and the preceding judgment target section, the environment judgment unit may further detect the predetermined time point as the time point at which the environment is changed.

Also, each of the environmental sound categories may be related to transportation, and the sound analysis device may further comprise: a position information detection unit operable to detect position information indicating a position of a user of the sound analysis device; a speed estimation unit operable to estimate speed by acquiring the position information at predetermined intervals and calculating a distance between each two adjacent time points; and a selection unit operable to select, from among the plurality of environmental sound categories, at least one environmental sound category as a candidate for transportation of the user, based on the speed estimated by the speed estimation unit, wherein in a case where the at least one environmental sound category selected by the selection unit is changed between the most recent judgment target section and the preceding judgment target section, the environment judgment unit may further detect the predetermined time point as the time point at which the environment is changed.

With the stated structure, the environment judgment unit detects the predetermined time point as the time point at which the environment is changed, in a case where the at least one environmental sound category selected by the selection unit is changed between the most recent judgment target section and the preceding judgment target section. This improves the accuracy in detecting a time point at which an environment is changed.

Here, each of the environmental sound categories may be related to transportation, and the time point at which the environment is changed and that is detected by the environment judgment unit may be a time point at which transportation of a user is changed.

This makes it possible to judge the transportation that is being used, based on only the audio signal.

BRIEF DESCRIPTION OF THE DRAWING

FIG. 3 shows the accumulation of results of classification;

DESCRIPTION OF CHARACTERS

Figure 1:
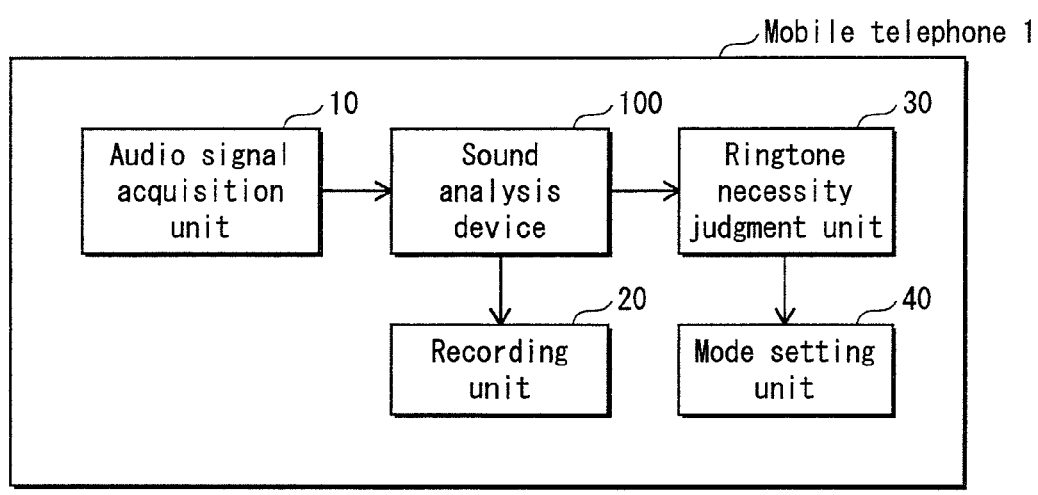
FIG. 1 is a functional block diagram of a mobile telephone 1.

1 Mobile telephone
10 Audio signal acquisition unit
20 Recording unit
30 Ringtone necessity judgment unit
40 Mode setting unit
100-100f Sound analysis devices
110 Environmental sound classification unit
111 Sound parameter calculation unit
112 Category classification unit
113 Pre-learned data holding unit
120 Event splitting point judgment unit
121 Accumulation unit
122 and 122b Time section setting unit
123, 123a, and 123b Read unit
124 Category occupancy calculation unit
125 Environment judgment unit
126 Segment determination unit
127 User movement judgment unit
128, 128d, and 128f Transportation judgment unit 129 and 129e Transportation candidate estimation unit
130 Power spectrum calculation unit
140 Movement detection unit
150 Position information detection unit
160 Map information holding unit
170 Speed estimation unit

DETAILED DESCRIPTION OF THE INVENTION

The following describes embodiments of a sound analysis device according to the present invention, with reference to the attached drawings.

Embodiment 1

Structure of Mobile Telephone 1

A sound analysis device 100 according to the present invention is, for example, included in a mobile telephone 1.

FIG. 1 is a functional block diagram showing the structure of the mobile telephone 1. As shown in FIG. 1, the mobile telephone 1 includes an audio signal acquisition unit 10, a sound analysis device 100, a recording unit 20, a ringtone necessity judgment unit 30, and a mode setting unit 40.

Specifically, the audio signal acquisition unit 10 includes a microphone, and transmits, to the sound analysis device 100, an audio signal acquired by the microphone.

The sound analysis device 100 judges an environment that surrounds the mobile telephone 1, based on the audio signal input from the audio signal acquisition unit 10. Then, the sound analysis device 100 transmits a result of the judgment as environment information, to the recording unit 20 and the ringtone necessity judgment unit 30.

The recording unit 20 records the environment information input from the sound analysis device 100.

The ringtone necessity judgment unit 30 judges whether or not a ringtone is necessary, based on the environment information input from the sound analysis device 100, and transmits a result of the judgment to the mode setting unit 40.

The mode setting unit 40 performs the mode setting of the mobile telephone 1, based on the result of the judgment input from the ringtone necessity judgment unit 30.

<Structure of Sound Analysis Device 100>

Figure 2:
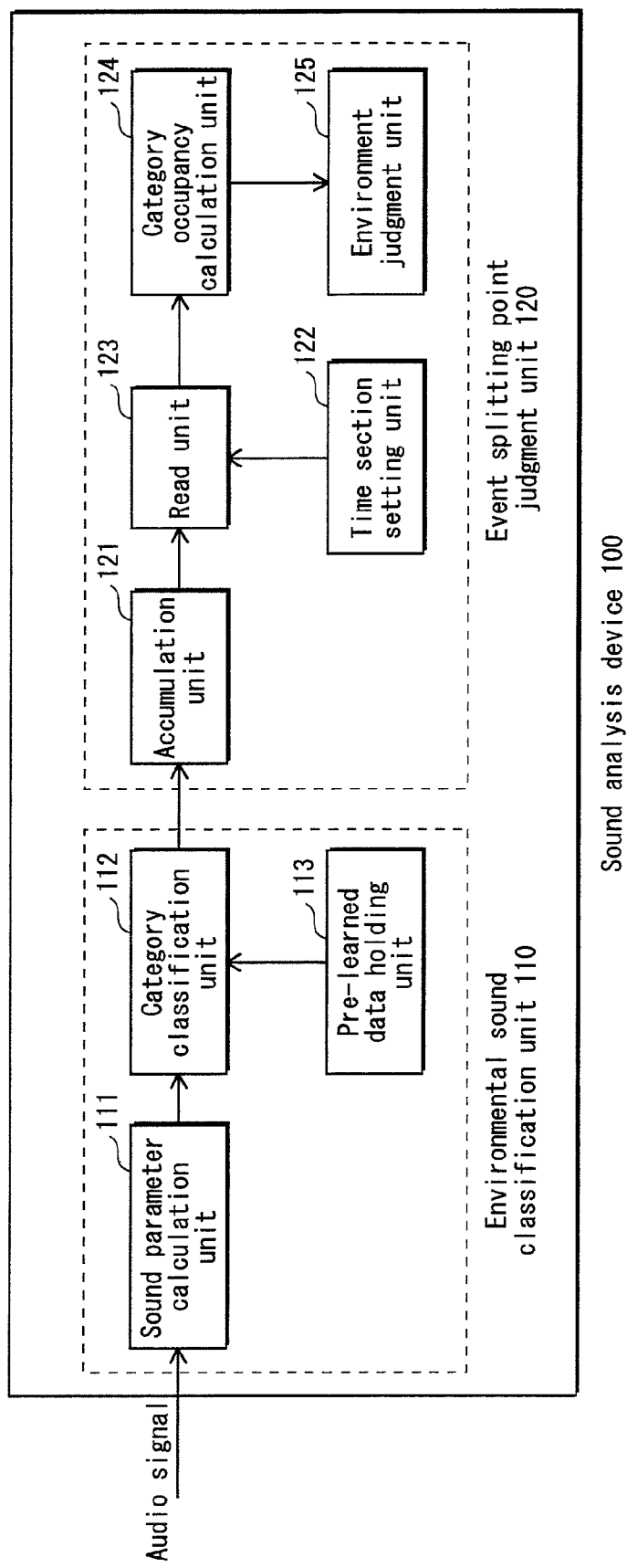
FIG. 2 is a functional block diagram of a sound analysis device 100 of Embodiment 1.

The following describes the internal structure of the sound analysis device 100. FIG. 2 is a functional block diagram of the sound analysis device 100. The sound analysis device 100 includes an environmental sound classification unit 110 and an event splitting point judgment unit 120.

Specifically, the sound analysis device 100 is a computer system including a digital signal processor (hereinafter referred to as a DSP), a microprocessor, a ROM, a RAM, etc. The ROM has recorded therein a computer program. The sound analysis device 100 achieves its functions by the DSP and the microprocessor operating in accordance with the computer program.

Specifically, the environmental sound classification unit 110 is realized by the DSP, etc., and includes a sound parameter calculation unit 111, a category classification unit 112, and a pre-learned data holding unit 113.

The sound parameter calculation unit 111 acquires the audio signal from the audio signal acquisition unit 10 for each unit time (e.g., one second), and calculates the sound parameter of the audio signal for each unit time (hereinafter referred to as "partial sound signal"). Then, the sound parameter calculation unit 111 transmits, to the category classification unit 112, the sound parameters that have been calculated.

Each sound parameter may be, for example, a sound spectrum, a spectral centroid, a cepstrum, the amount of characteristic MFCC (Mel Frequency Cepstrum Coefficient) of a cepstrum region, or the like.

The category classification unit 112 determines, for each of the partial audio signals in units of time that respectively correspond to the sound parameters input from the sound parameter calculation unit 111, an environmental sound category that each partial audio signal belongs to, with reference to pre-learned data held by the pre-learned data holding unit 113.

Here, the environmental sound categories include, for example, indoors, outdoors, BGM, voice, walk, the inside of a car, the inside of a bus, the inside of a train, or the like. The indoors is further classified into background noises, non-steady sounds, the sound of a crowd, and other sounds. The background noises are, for example, a sound of a fan, a sound of an air-conditioner, etc. The non-steady sounds are, for example, a sound of friction, a rustling sound of clothes, a tapping sound, etc. The sound of a crowd is, for example, a loud buzzing noise, a sound in a restaurant, etc. The other sounds are indoor sounds that are not the sounds described above, such as a bustling noise in a building.

The outdoors is further classified into natural noises, traffic noises, and other sounds. The natural noises are, for example, a sound of wind, a sound of a running river, a sound of a birdsong, etc. The traffic noises are the sounds of cars, motorbikes, trains, etc. The other sounds are outdoor sounds that are not the sounds described above, such as a bustling noise outside. The voices are not limited to conversations, but include sounds recognizable as voices. The BGM is a sound that mainly includes music as a background sound. The walking is a sound that mainly includes a sound of walking. A sound in a car is a sound that is other than a sound of a voice and that is heard in a car when the car is moving, such as a sound of an engine. A sound in a bus is a sound that is other than a sound of a voice and that is heard when the bus is moving, such as a sound of an engine. A sound in a train is a sound that is other than a sound of a voice and that is heard when the train is moving, such as a sound of a motor.

The following describes in detail a process of classifying the partial audio signals into the environmental sound categories. In order to perform the process of the classification, a machine learning method, such as a GMM (Gaussian Mixture Model) or an entropy hidden markov model (EP-HMM), is used. In such a machine learning method, sound parameters of an audio signal, which are parameters of the environmental sound categories, are prepared in advance as pre-learned data. Then, the sound parameters input from the sound parameter calculation unit 111 are compared to the sound parameters (pre-learned data) of the environmental sound categories held in the pre-learned data holding unit 113, thereby determining whether the sound of each sound parameter input from the sound parameter calculation unit 111 is similar to the sound of a corresponding one of the pre-learned data pieces. The category classification unit 112 classifies a partial audio signal targeted for the category classification as an environmental sound category that corresponds to a sound parameter determined to be similar, and transmits a result of the classification to the accumulation unit 121.

The pre-learned data holding unit 113 holds the sound parameters of the audio signal as pre-learned data, which are the parameters of the environmental sound categories.

The event splitting point judgment unit 120 is realized by a microprocessor or the like, and includes an accumulation unit 121, a time section setting unit 122, a read unit 123, a category occupancy calculation unit 124, and an environment judgment unit 125.

Specifically, the accumulation unit 121 includes a buffer or the like, and accumulates results of the classification of the partial audio signals input from the category classification unit 112. The environmental sound categories are respectively defined by bits, such as 001, 010, 011, 100 . . . , and the accumulation unit 121 accumulates the results of classification performed for each unit of time as bits. FIG. 3 shows accumulation of the results of classification. As shown in FIG. 3, the accumulation unit 121 accumulates the results of classification by associating time and an environmental sound category at the time.

The time section setting unit 122 sets the start point and end point of a judgment target section along the time axis when necessary over time, based on setting information that has been recorded in advance. Specifically, the judgment target section is a section (e.g., section of 30 seconds) that includes a plurality of (e.g., greater than or equal to three) continuous units of time. Note that the accumulation unit 121 is assumed to have at least a capacity necessary to accumulate the results of classification for the judgment target section.

The read unit 123 judges whether the results of classification for the judgment target section set by the time section setting unit 122 have been accumulated in the accumulation unit 121. When judging that the results of classification have been accumulated, the read unit 123 reads the results of classification from the accumulation unit 121, and transmits the read results of classification to the category occupancy calculation unit 124.

The category occupancy calculation unit 124 calculates category occupancies in the judgment target section based on the results of classification of partial audio signals input from the read unit 123. Then, the category occupancy calculation unit 124 transmits the calculated category occupancies to the environment judgment unit 125. Note here that each of the category occupancies refers to the ratio of a different one of environmental sound categories in the judgment target section.

The environment judgment unit 125 judges the environment surrounding the mobile telephone 1, based on the category occupancies input from the category occupancy calculation unit 124. Then, the environment judgment unit 125 transmits, to the recording unit 20 and the ringtone necessity judgment unit 30, environment information indicating the environment that has been judged. Furthermore, in a case where the environment has changed, the environment judgment unit 125 detects the time point of the change, and sends the time point to the recording unit 20.

<Operation of Sound Analysis Device 100>

Figure 4:
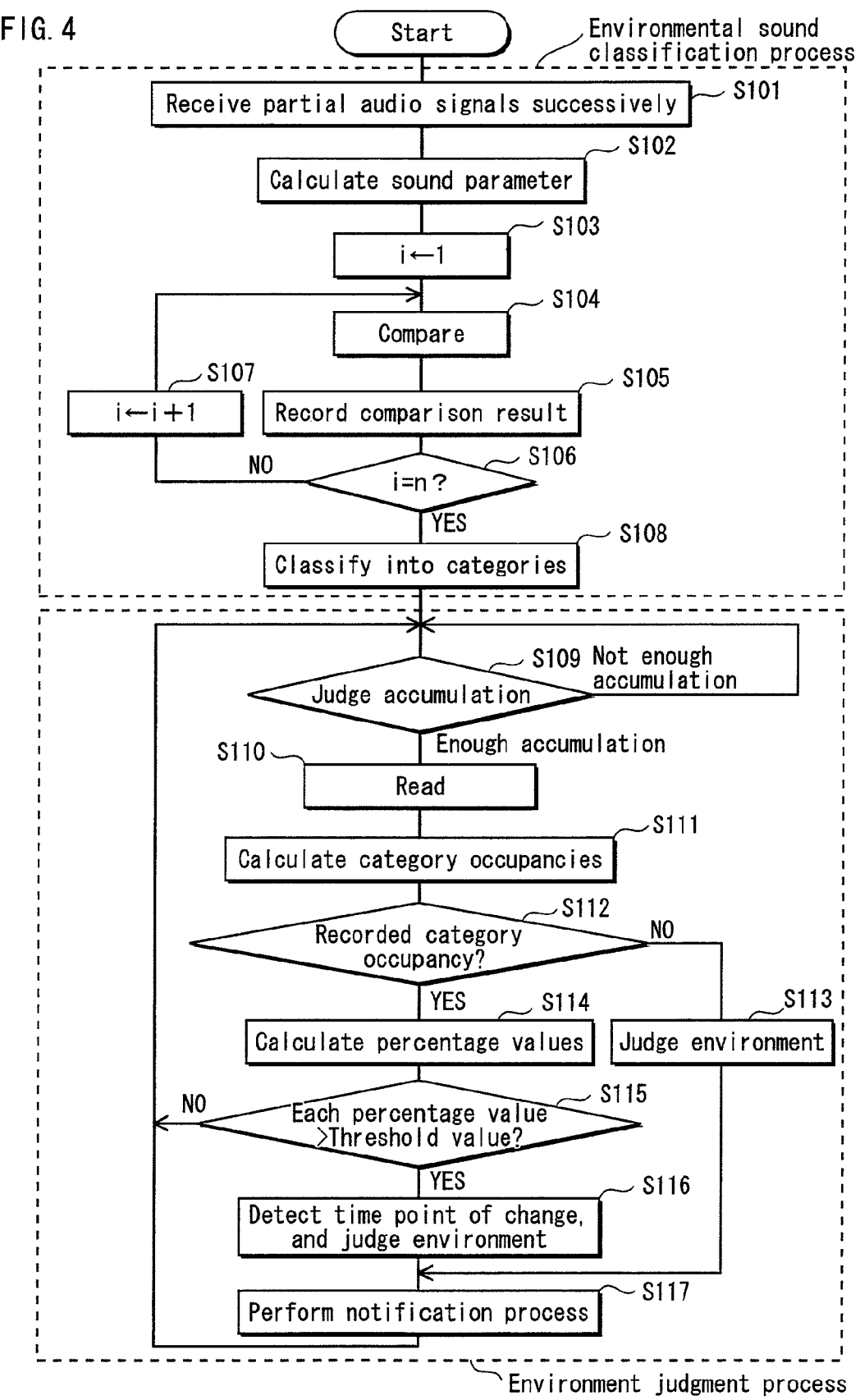
FIG. 4 is a flowchart showing the process steps of the sound analysis device 100.

FIG. 4 is a flowchart showing the process steps of the sound analysis device 100. In this flowchart, i is a variable that specifies one environmental sound category, and the number of categories is assumed to be n. The sound parameter calculation unit 111 successively receives partial audio signals collected by the audio signal acquisition unit 10 (step S101). Upon receipt of a partial audio signal, the sound parameter of the received partial audio signal is calculated (step S102). After the sound parameter is calculated, the variable i is initialized (step S103), and the calculated sound parameter is compared to the sound parameter of the environmental sound category corresponding to the initialized variable i (step S104). After a result of the comparison is stored (step S105), whether i=n is judged (step S106). If there are any other environmental sound categories (No in step S106), the variable i is incremented by 1 (step S107) and the process returns to step S104. After the calculated parameter has been compared to the sound parameter of each of the environmental sound categories (Yes in step S106), the environmental sound category to which the partial audio signal belongs is determined (step S108). Specifically, from among the sound parameters of the environmental sound categories, a sound parameter closest to the sound parameter of the partial audio signal is determined.

The read unit 123 judges whether the amount of accumulation in the accumulation unit 121 has reached a necessary amount (step S109). When the amount has reached the necessary amount (Yes in step S109), the read unit 123 reads the results of classification, and transmits the read results of classification to the category occupancy calculation unit 124 (step S110). Upon receipt of the results of classification, the category occupancy calculation unit 124 calculates, from the results of classification, category occupancies in the judgment target section (step S111), and judges whether there is any category occupancy that has already been recorded (step S112). When there is no category occupancy that has been recorded (No in step S112), the calculated category occupancies are recorded and an environment is judged based on the calculated category occupancies (step S113). Specifically, the environment is judged by determining an environmental sound category having the highest occupancy, from among the occupancies of the respective environmental sound categories in the judgement target section. After the environment is judged, environment information indicating the environment is transmitted to the recording unit 20 and the ringtone necessity judgment unit 30 (step S117). This makes it possible for applications to operate in accordance with the environment.

When there is any category occupancy that has been recorded (Yes in step S112), a percentage value, which indicates the percentage of a change between a category occupancy that has been calculated and the category occupancy that has been recorded, is calculated (step S114). A percentage value is calculated for each environmental sound category. The environment judgment unit 125 compares each of the percentage values to a predetermined threshold value and judges whether each percentage value is larger than the threshold value (step S115). When every percentage value is equal to or smaller than the threshold value (No in step S115), the calculated category occupancies are recorded and the process returns to step S109. When there is any percentage value that is larger than the threshold value (Yes in step S115), the start point of the judgment target section that corresponds to the calculated category occupancies is detected as an environment change time point that is a time point at which the environment is changed, and a judgment of environment is performed (step S116). Specifically, when there is any environmental sound category whose occupancy has been increased beyond the threshold value, the environmental sound category is set to the environment after the change. When there is any environmental sound category whose occupancy has been decreased below the threshold value, an environmental sound category having the highest occupancy, from among the environmental sound categories, is set to the environment after the change. Then, the environment information and the environment change time point are transmitted to the recording unit 20, and the environment information is transmitted to the ringtone necessity judgment unit 30 (step S117).

As described above, upon receipt of new category occupancy, the environment judgment unit 125 judges the environment by judging whether or not a rate of change between (i) the new category occupancy and (ii) each of the category occupancies in a preceding judgment target section has exceeded the threshold value. Also, when the environment is changed, the environment judgment unit 125 detects the time point at which the environment is changed.

<Operation of Mobile Telephone 1>

Figure 5:
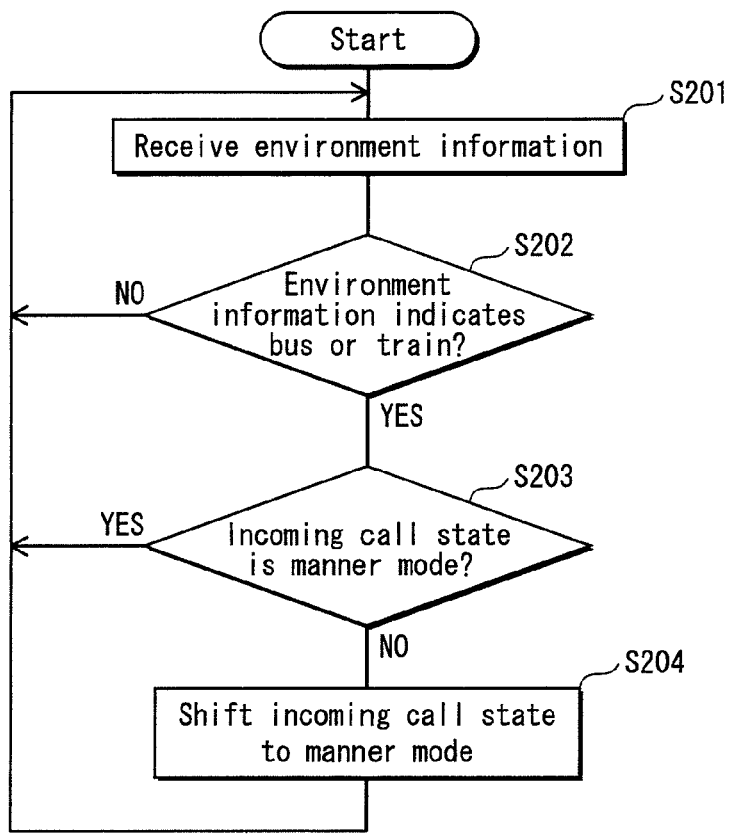
FIG. 5 is a flowchart showing process steps related to an automatic shift of the mobile telephone 1 to a manner mode.

FIG. 5 is a flowchart showing process steps related to a function of the mobile telephone 1 automatically shifting to a manner mode. The ringtone necessity judgment unit 30 receives environment information input from the sound analysis device 100 (step S201). Upon receipt of the environment information, the ringtone necessity judgment unit 30 judges whether the environment information indicates a bus or a train (step S202).

When the environment information indicates something other than a bus or a train (No in step S202), the process returns to step S201. When the environment information indicates a bus or a train (Yes in step S202), the mode setting unit 40 judges whether or not the state of the mobile telephone 1 for incoming calls (hereinafter referred to as "incoming state") is a manner mode (step S203).

When the incoming state is a manner mode (Yes in step S203), the process returns to step S201. When the incoming state is not a manner mode (No in step S203), the incoming state is set to a manner mode (step S204).

<Specific Example>

Figure 6:
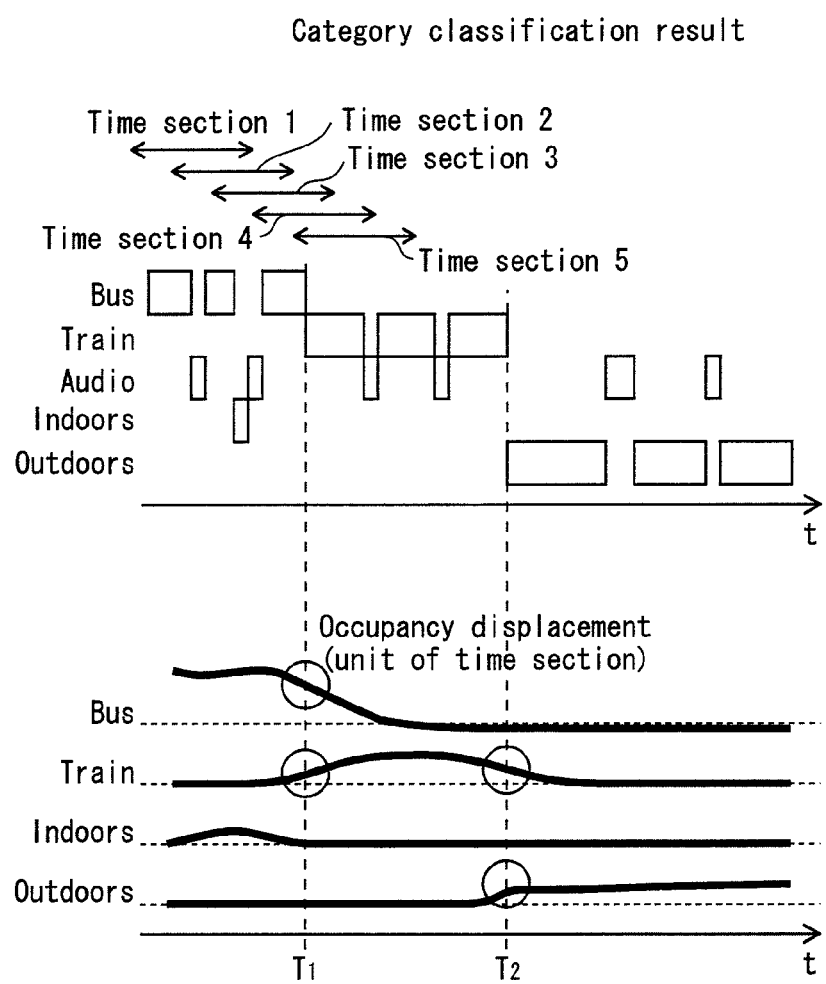
FIG. 6 shows, in chronological order, (i) a classification result for each environmental sound category and (ii) a change of each category occupancy in units of time sections in Embodiment 1.

FIG. 6 schematically shows the characteristics of Embodiment 1. The upper part of FIG. 6 shows a classification result for each environmental sound category. The lower part of FIG. 6 shows a change of each category occupancy over time in units of time sections. The horizontal axis in FIG. 6 is a time axis. The bus, train, voice, indoors, and outdoors in FIG. 6 indicate environmental sound categories, respectively.

Figure 7:
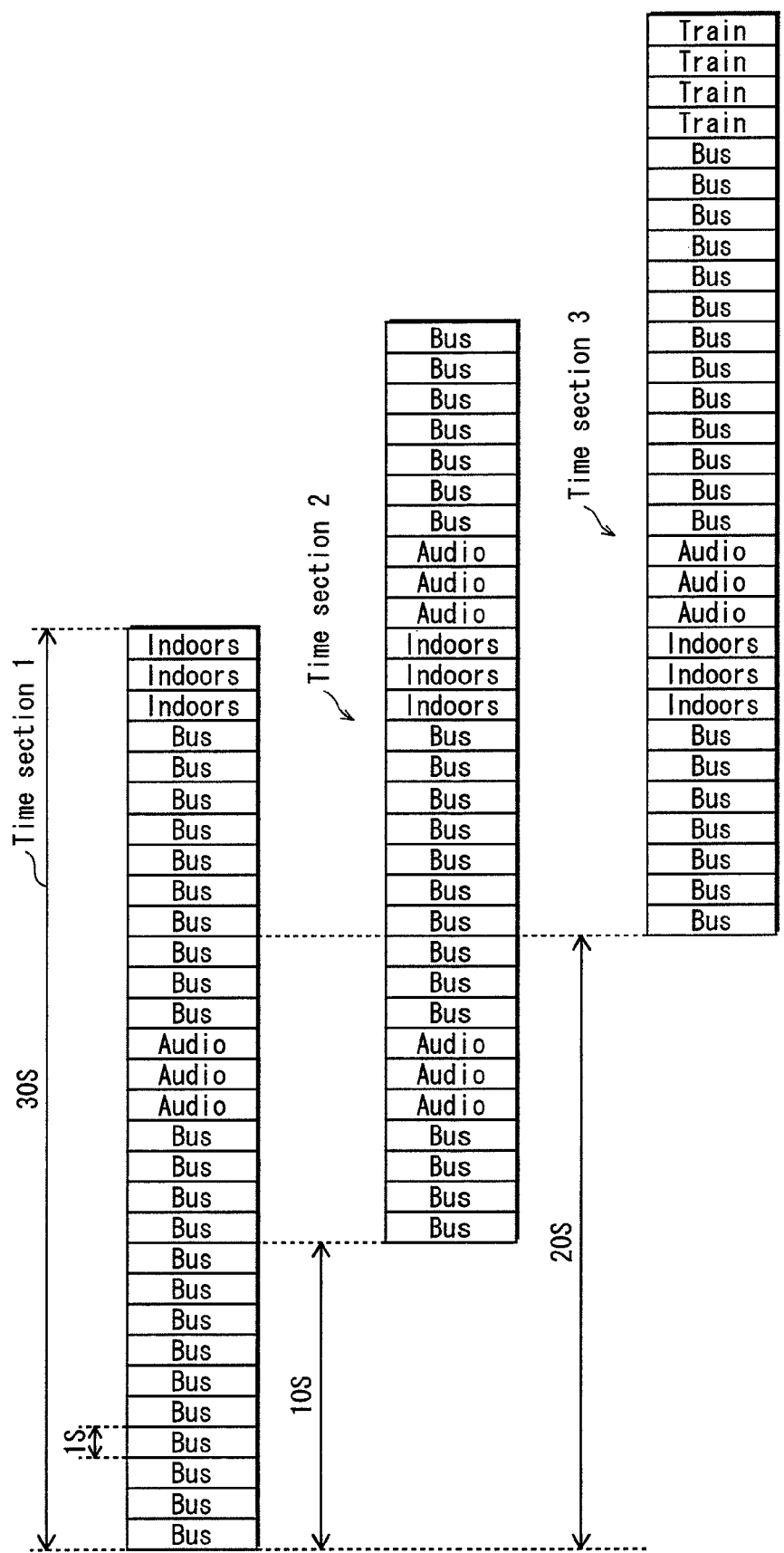
FIG. 7 shows in detail a change of each category occupancy, for each time section.
Figure 8:
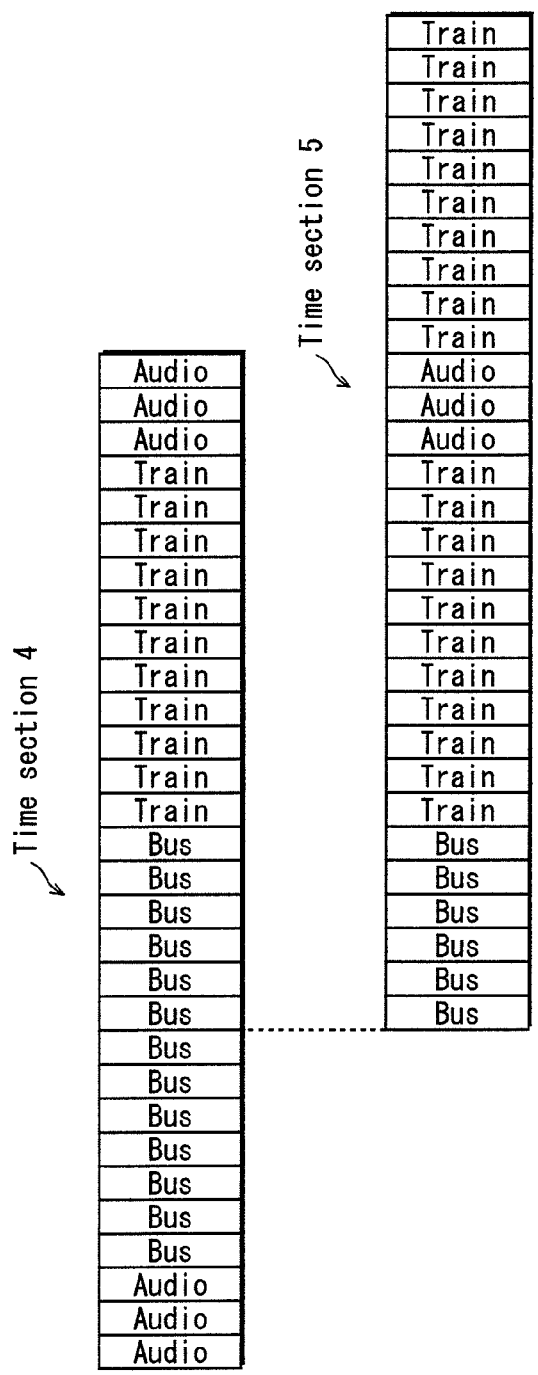
FIG. 8 shows in detail a change of category occupancy for each time section.

FIGS. 7 and 8 show the details of the environmental sound categories included in each time section shown in FIG. 6. As shown in FIGS. 7 and 8, each time section has 30 seconds, and is shifted in the direction of time axis by 10 seconds.

As shown in the upper part of FIG. 6, the time section setting unit 122, for example, successively sets the judgment target sections in the direction of time axis such that the judgment target sections overlap each other (time section 1, time section 2, time section 3, time section 4, time section 5, . . . ). In this way, the accuracy of the detection of an environmental change is increased. The setting of the judgment target sections is performed based on time section information, overlap information, etc., which are held by the time section setting unit 122 in advance. The time section information indicates the length of a time section, and the overlap information indicates the extent of overlap between each of the judgment target sections.

The category occupancy calculation unit 124 calculates, for each time section, the occupancy of each environmental sound category. As shown in FIG. 7, in time section 1, the time during which the environmental sound category is judged to be the "bus" is 24 seconds in total, the time during which the environmental sound category is judged to be the "voice" is 3 seconds in total, the time during which the environmental sound category is judged to be the "indoors" is 3 seconds in total. Therefore, the category occupancy calculation unit 124 calculates that the occupancy of the "bus" is 80%, and the occupancies of the "voice" and the "indoors" are 10%, respectively. Since the occupancy of the "bus" is the highest, the environment judgment unit 125 judges that the environment in the time section 1 is the "bus".

In the same manner, in the time section 2, the time during which the environmental sound category is judged to be the "bus" is 21 seconds in total, the time during which the environmental sound category is judged to be the "voice" is 6 seconds in total, the time during which the environmental sound category is judged to be the "indoors" is 3 seconds in total. Therefore, the category occupancy calculation unit 124 calculates that the occupancy of the "bus" is 70%, the occupancy of the "voice" is 20%, and the occupancy of the "indoors" is 10%.

In the time section 3, the time during which the environmental sound category is judged to be the "bus" is 20 seconds in total, the time during which the environmental sound category is judged to be the "voice" is 3 seconds in total, the time during which the environmental sound category is judged to be the "indoors" is 3 seconds in total, and the time during which the environmental sound category is judged to be the "train" is 4 seconds in total. Therefore, the category occupancy calculation unit 124 calculates that the occupancy of the "bus" is 67%, the occupancies of the "voice" and the "indoors" are 10%, respectively, and the occupancy of the "train" is 13%.

In the time section 4, the time during which the environmental sound category is judged to be the "bus" is 13 seconds in total, the time during which the environmental sound category is judged to be the "voice" is 6 seconds in total, and the time during which the environmental sound category is judged to be the "train" is 11 seconds in total. Therefore, the category occupancy calculation unit 124 calculates that the occupancy of the "bus" is 43%, the occupancy of the "voice" is 20%, and the occupancy of the "train" is 37%.

In the time section 5, the time during which the environmental sound category is judged to be the "train" is 21 seconds in total, the time during which the environmental sound category is judged to be the "voice" is 3 seconds in total, and the time during which the environmental sound category is judged to be the "bus" is 6 seconds in total. Therefore, the category occupancy calculation unit 124 calculates that the occupancy of the "train" is 70%, the occupancy of the "voice" is 10%, and the occupancy of the "bus" is 20%.

Assume here that a threshold value to be compared to a rate of change in category occupancy is assumed to be 0.3 (category occupancy being 30%). In this case, each of the category occupancies do not exceed the threshold value when shifting from the time section 1 to the time section 2, from the time section 2 to the time section 3, and from the time section 3 to the time section 4.

Therefore, the environment judgment unit 125 judges that the environment during the time sections 1 through 4 is the "bus". However, when shifting from the time section 4 to the time section 5, the occupancy of the "train" is displaced from 35% to 70%. This means that the occupancy of the "train" has changed beyond the threshold value.

Therefore, the environment judgment unit 125 judges that the environment in the time section 5 is the "train", and detects the start point of the time section 5 as the time point at which the environment is changed, as shown by the circles (at the time point $T_1$) in the lower part of FIG. 6.

As described above, by calculating the category occupancies for each judgment target section and judging whether or not each of the category occupancies is changed by exceeding the threshold value, the environment can be appropriately judged even if there is some noise (e.g., voice) in the background.

According to the present embodiment, even if a part of the judgment target section includes a noise, an environment is judged based on the number of partial audio signals in each environmental sound category determined in other parts in the judgment target section. Therefore, it is possible to increase robustness with respect to judgment of an environment. Also, the mobile telephone 1 records a time point at which the environment is changed. Therefore, based on this time point, it is possible to perform, for example, an analysis of the behavioral pattern of the user, etc.

Embodiment 2

In Embodiment 1, each of the judgment target sections set by the time section setting unit 122 is set such that the length of each judgment target section is fixed to 30 seconds. However, in the present embodiment, each of the judgment target sections (hereinafter also referred to as "segments") is set based on the time displacement of the power spectrum of the audio signal.

<Structure of Sound Analysis Device 100a>

Figure 9:
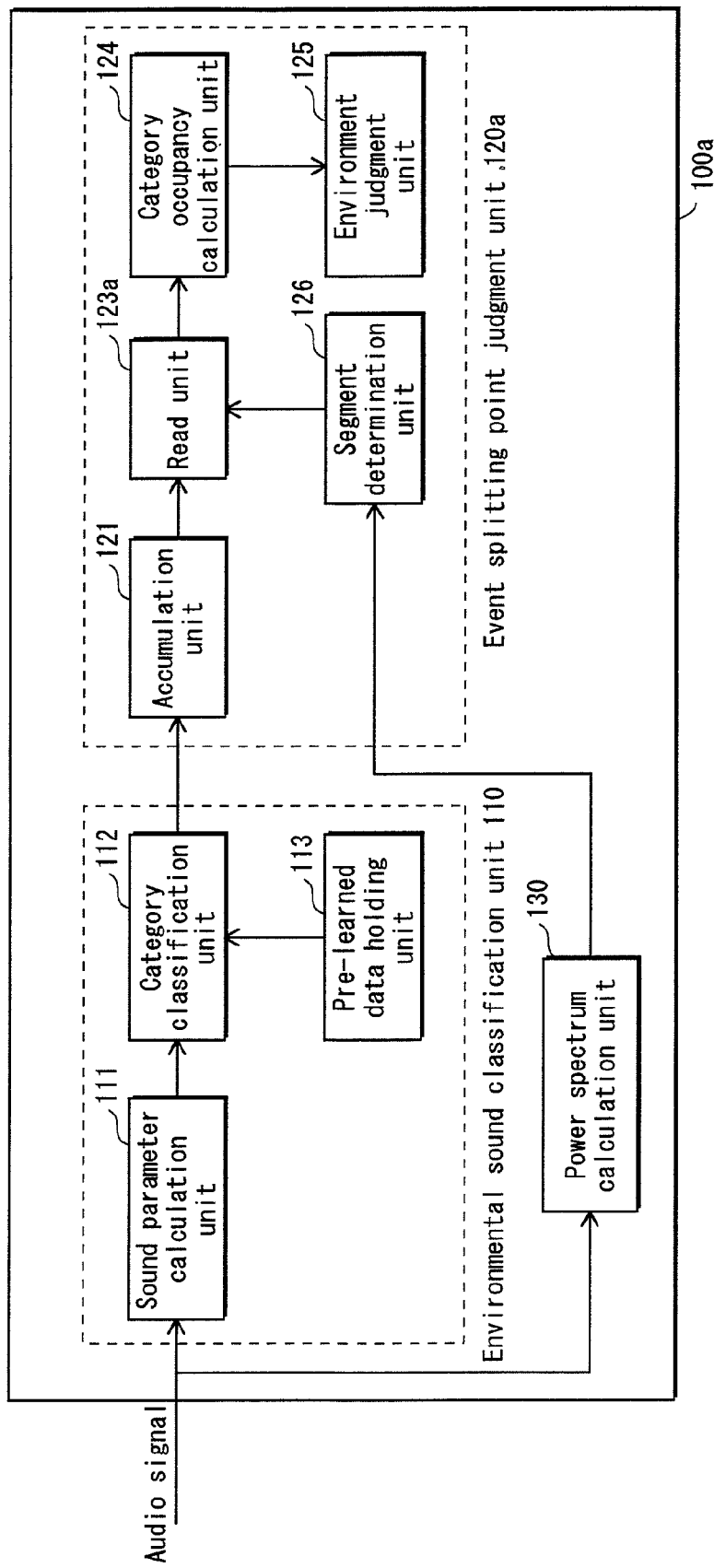
FIG. 9 is a functional block diagram of a sound analysis device 100a in Embodiment 2.
Figure 10:
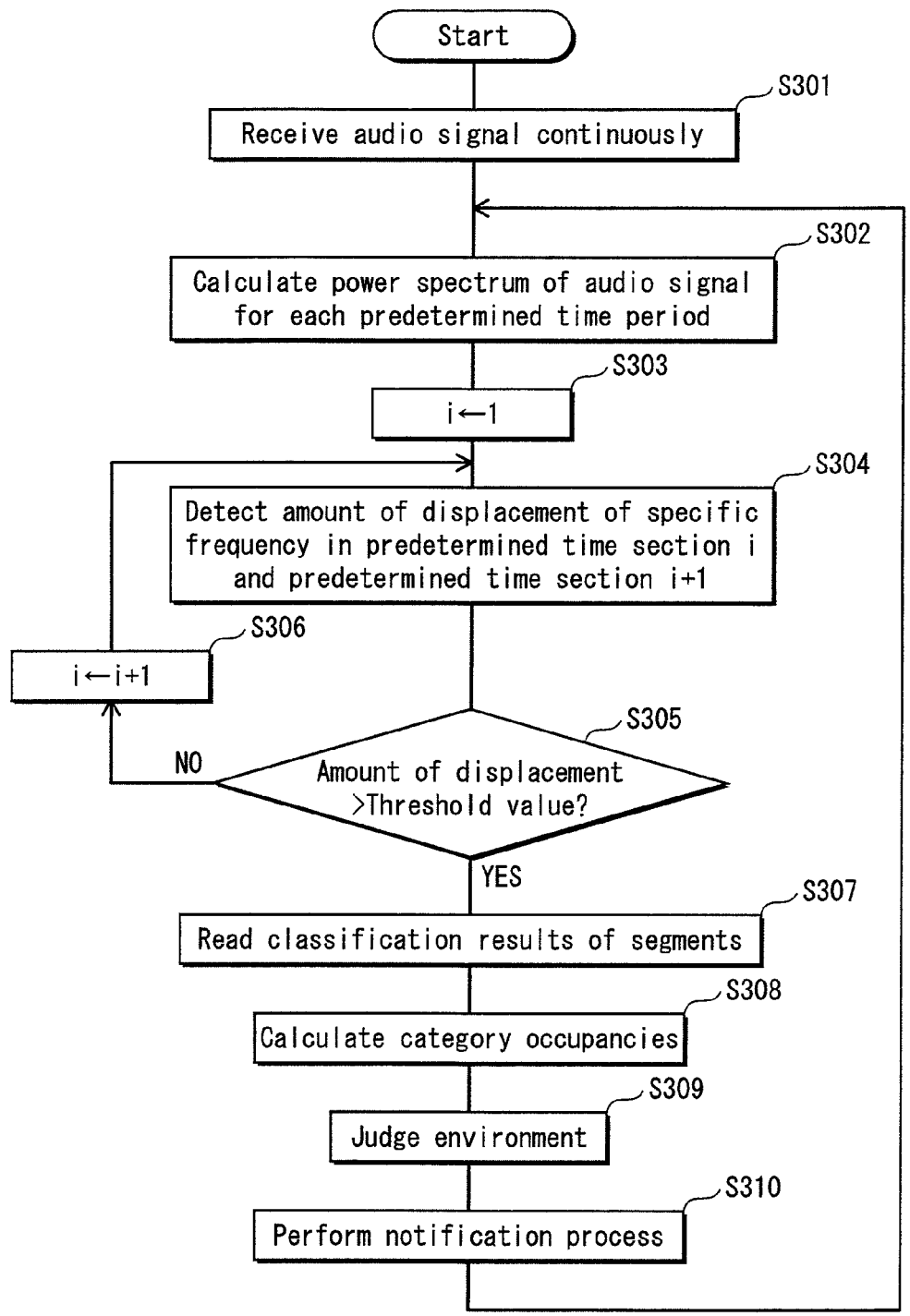
FIG. 10 is a flowchart showing process steps related to the sound analysis device 100a determining segments.

FIG. 9 is a functional block diagram of a sound analysis device 100a in the present embodiment. As shown in FIG. 9, the sound analysis device 100a includes a power spectrum calculation unit 130, in addition to the components of the sound analysis device 100 in Embodiment 1. Also, an event splitting point judgment unit 120a includes a segment determination unit 126 instead of the time section setting unit 122 in Embodiment 1.

The power spectrum calculation unit 130 calculates the power spectrum of the audio signal input from the audio signal acquisition unit 10, and transmits the calculated power spectrum to the segment determination unit 126. Specifically, the audio signal input from the audio signal acquisition unit 10 is split into predetermined units of time, and the power spectrum of the audio signal for each predetermined time period is calculated with use of an FFT (Fast Fourier Transform).

The segment determination unit 126 determines the start point and end point of each of the segments, based on the power spectrum of the audio signal for each predetermined time period input from the power spectrum calculation unit 130. Specifically, the segment determination unit 126 detects the amount of displacement of a specific frequency by overlapping the power spectra in adjacent predetermined time sections. Then, the segment determination unit 126 judges whether or not the detected amount of displacement has exceeded a predetermined threshold value. When judging that the detected amount of displacement has exceeded the predetermined threshold value, the segment determination unit 126 determines that the boundary point between adjacent predetermined time sections that corresponds to the detected amount of displacement is the boundary point of a segment. This boundary point is the start point of a new segment as well as the end point of a preceding segment. When judging that the detected amount of displacement has exceeded the predetermined threshold value again after the previous judgment, the segment determination unit 126 determines that the boundary point between adjacent predetermined time sections that corresponds to the detected amount of displacement is the endpoint of the new segment.

As described above, the segment determination unit 126 determines the start point and end point of a segment, and transmits the start point and endpoint of the segment to a read unit 123a.

The read unit 123a receives the start point and end point of the segment transmitted from the segment determination unit 126, reads from the accumulation unit 121 results of the category classification for the segment that has been received, and transmits the results of the category classification that have been read to the category occupancy calculation unit 124.

<Operation of Sound Analysis Device 100a>

The following is a flowchart showing process steps in which the sound analysis device 100a determines a segment. In this flowchart, i is a variable specifying one predetermined time section. The power spectrum calculation unit 130 continuously receives an audio signal collected by the audio signal acquisition unit 10 (step S301). Upon receipt of the audio signal, the power spectrum calculation unit 130 calculates the power spectrum of the audio signal for each predetermined time section (step S302). The segment determination unit 126 initializes the variable i (step S303), and detects the amount of change in a specific frequency between the predetermined time section i and a predetermined time section i+1 (step S304). Then, the segment determination unit 126 compares the amount of change that has been detected and a threshold value (step S305). When the amount of change is equal to or smaller than the threshold value (No in step S305), the variable i is incremented by 1 (step S306), and the process returns to step S304.

When the amount of change is larger than the threshold value (Yes in step S305), the read unit 123a reads results of classification up to the boundary point between adjacent predetermined time sections that corresponds to the amount of change, as results of classification in a segment (step S307). The category occupancy calculation unit 124 calculates the category occupancies in the segment (step S308), and the environment judgment unit 125 judges the environment in the segment based on the category occupancies (step S309). After judging the environment, the environment judgment unit 125 transmits the environment information to the recording unit 20 and the ringtone necessity judgment unit 30 (step S310).

<Specific Example>

Figure 11:
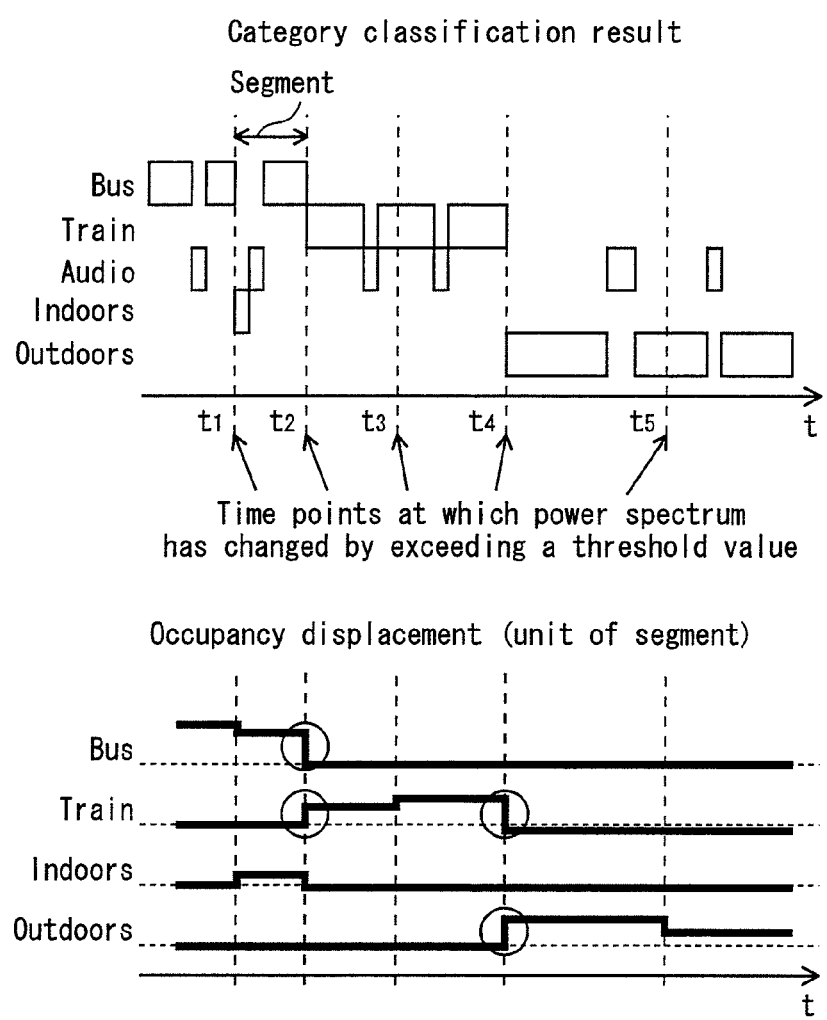
FIG. 11 shows, in chronological order, (i) a classification result for each environmental sound category and (ii) a change of each category occupancy in units of time sections in Embodiment 2.

FIG. 11 schematically shows the characteristics of Embodiment 2. The upper part of FIG. 11 shows a classification result for each environmental sound category. The lower part of FIG. 11 shows a change of category occupancies over time in units of segments. The horizontal axis in FIG. 11 is a time axis. The bus, train, voice, indoors, and outdoors in FIG. 11 indicate environmental sound categories, respectively.

The specific example of Embodiment 2 is different from that of Embodiment 1, since the category occupancies in a segment are calculated instead of those in a predetermined time section (30 seconds). In FIG. 11, each time point from a time point t1 to a time point t5 is a time point at which the power spectrum is changed beyond a threshold value, namely a boundary point between segments. A section from the time point t1 to the time point t2 is one segment, and the sound analysis device 100a calculates the category occupancies in the segment.

In the same manner, a section from the time point t2 to the time point t3 is one segment, a section from the time point t3 to the time point t4 is one segment, and a section from the time point t4 to the time point t5 is one segment.

The environment judgment unit 125 judges an environment in each of the segments, based on the category occupancies in each segment. Also, when the category occupancies are changed beyond a predetermined threshold value in adjacent segments, which are a temporally preceding segment and a temporally succeeding segment, the environment judgment unit 125 judges that the boundary between the adjacent segments is the breakpoint of the environmental change.

As described above, according to the present embodiment, a segment is set based on the temporal displacement of the power spectrum of the audio signal, and then the environment is judged based on the category occupancies in the segment. Therefore, it is possible to improve the accuracy of an environmental judgment. Also, after setting a segment, the time point of an environmental change is specified with use of a rate of change in category occupancies based on results of the classification of environmental sounds. Therefore, it is possible to further improve the accuracy of detecting the time point of an environmental change. For example, even if the category occupancies are gradually changing, the time point of an environmental change can be more accurately detected.

Note that, in the present embodiment, the accumulation unit 121 does not accumulate results of classification for a time period set by the time section setting unit 122, as seen in Embodiment 1. Instead, the accumulation unit 121 in Embodiment 2 accumulates results of classification between the start point and the end point of a segment determined by the segment determination unit 126. In other words, an amount of time in which the accumulation unit 121 accumulates results of classification cannot be set uniquely. Therefore, when determining the boundary point between segments, the accumulation unit 121 may record the maximum time length during which accumulation is possible, and a time point indicating the maximum amount of displacement within the maximum time length may be judged as the boundary point between the segments.

Embodiment 3

In Embodiment 1, the environment is judged to be changed when a rate of change between (i) the category occupancies in a temporally preceding judgment target section and (ii) the category occupancies in a temporally succeeding judgment target section is beyond a threshold value, and the time point at which the environment is changed is detected. In this case, however, there is a low possibility that an environmental change occurs without the movement of a user. Therefore, a sound analysis device according to the present embodiment includes a function of detecting the movement of a user. Then, when detecting that the user is moving, the sound analysis device judges the environment. When judging that the environment is changed, the sound analysis device detects a time point at which the environment is changed.

<Structure of Sound Analysis Device 100b>

Figure 12:
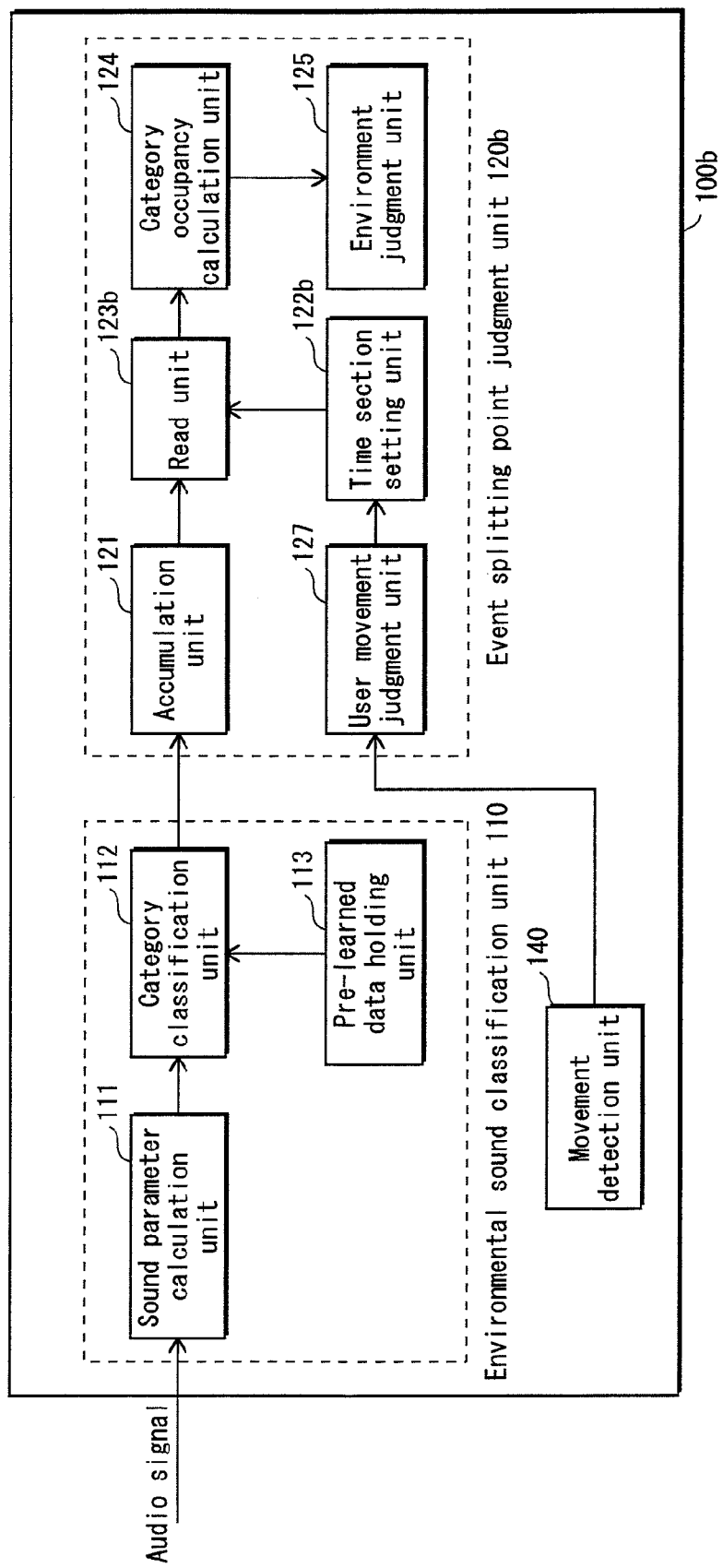
FIG. 12 is a functional block diagram of a sound analysis device 100b in Embodiment 3.

FIG. 12 is a functional block diagram of a sound analysis device 100b in the present embodiment. As shown in FIG. 12, the sound analysis device 100b includes a movement detection unit 140, in addition to the components of the sound analysis device 100 in Embodiment 1. Also, an event splitting point judgment unit 120b in the present embodiment includes a user movement judgment unit 127, in addition to the components of the event splitting point judgment unit 120 in Embodiment 1.

The movement detection unit 140 includes a triaxial acceleration sensor, a gyro sensor, an electronic altimeter, an electronic compass, etc. The movement detection unit 140 detects a movement of a user, and transmits, to the user movement judgment unit 127, movement information that has been detected. It is assumed that the sampling frequency of each of the triaxial acceleration sensor and the gyro sensor is set to, for example, 30 Hz or higher. Note that these sensors may be included in the mobile telephone 1 together with the sound analysis device 100b, or may be worn directly by the user.

The user movement judgment unit 127 judges whether or not the user is moving, based on the movement information input from the movement detection unit 140. Specifically, when the user is walking or running, a characteristic peak appears in the range of 2 Hz to 4 Hz. Therefore, whether or not the user is moving is judged by determining whether or not the characteristic peak is detected.

Also, the user movement judgment unit 127 transmits, to the time section setting unit 122b, a notification that is based on a result of the judgment.

The time section setting unit 122b has a function of controlling a read unit 123b based on the notification related to the movement of the user, the notification being input from the user movement judgment unit 127, in addition to the function of the time section setting unit 122 of Embodiment 1. Specifically, upon receipt of a notification that the user is moving, the time section setting unit 122b permits reading of the read unit 123b. Upon receipt of a notification that the user is not moving, the time section setting unit 122b does not permit reading of the read unit 123b.

In a user active section in which reading is permitted by the time section setting unit 122b, the read unit 123b reads results of classification from the accumulation unit 121 in the same manner as the read unit 123 in Embodiment 1. In a user inactive section in which reading is not permitted by the time section setting unit 122b, the read unit 123b does not read results of classification from the accumulation unit 121.

<Operation of Sound Analysis Device 100b>

Figure 13:
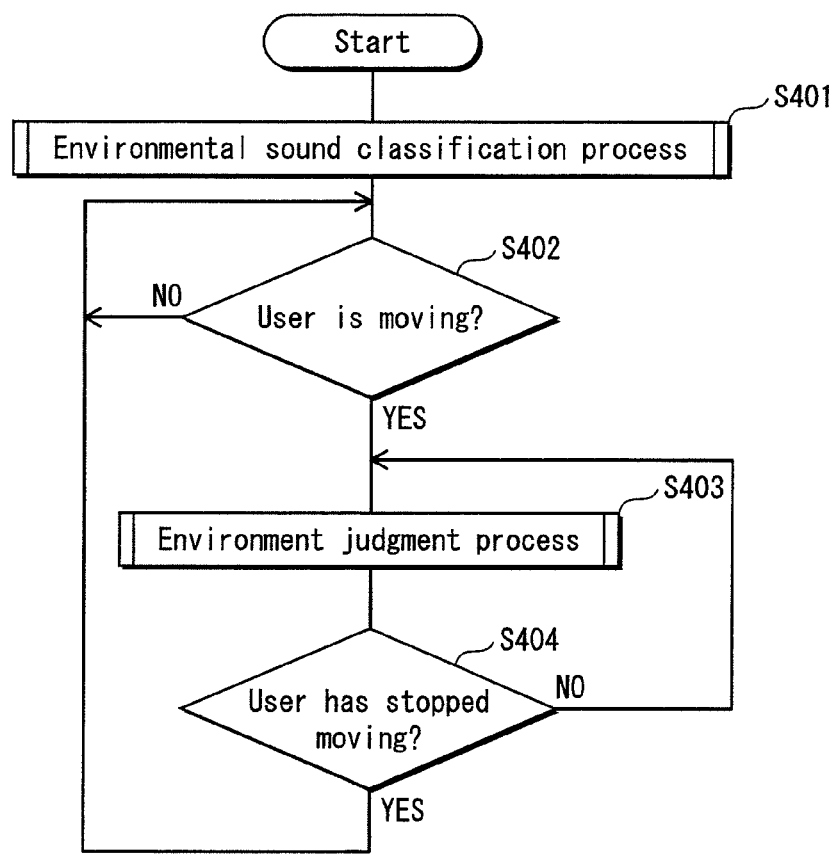
FIG. 13 is a flowchart showing the process steps of the sound analysis device 100b.

FIG. 13 is a flowchart showing the process steps of the sound analysis device 100b. A process for classifying environmental sounds shown in step S401 is the same as that shown in FIG. 4. The user movement judgment unit 127 judges whether or not the user is moving (step S402). When judging that the user is moving (Yes in step S402), the sound analysis device 100b performs a process for judging the environment (step S403). This process is the same as the environment judgment process shown in FIG. 4. The user movement judgment unit 127 judges whether or not the user has stopped moving (step S404). When judging that the user has stopped moving (Yes in step S404), the process returns to step S402. When judging that the user has not stopped moving (No in step S404), the process returns to step S403. In other words, the environment judgment process is performed in a section in which the user is judged to be moving.

<Specific Example>

Figure 14:
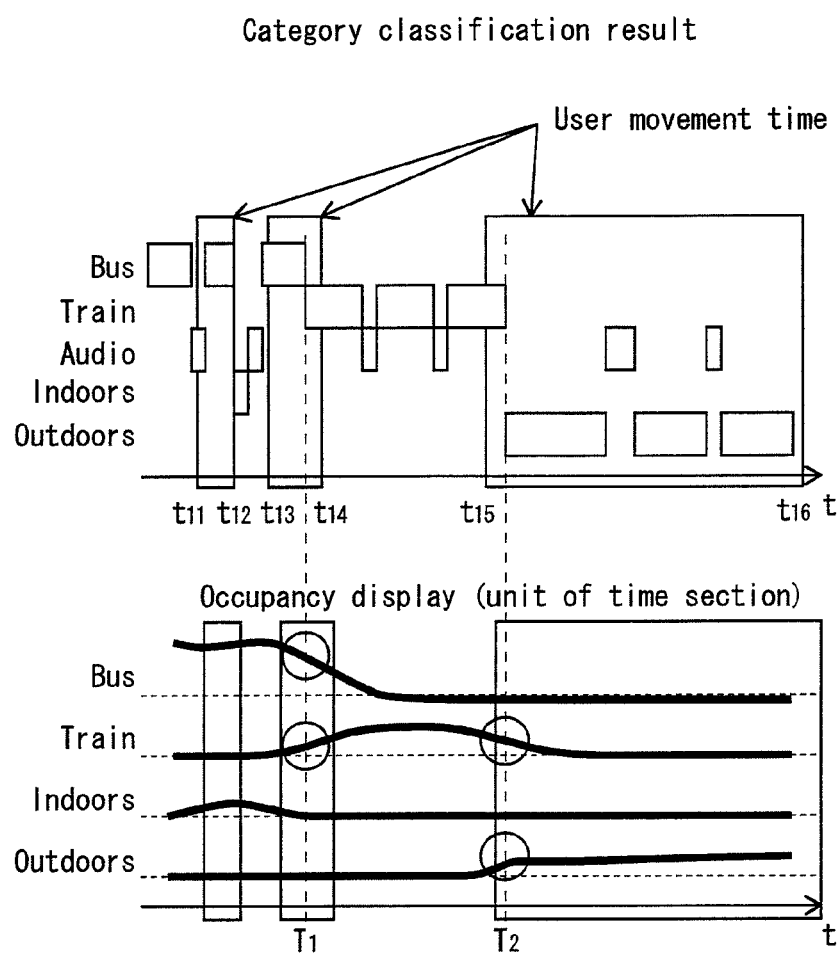
FIG. 14 shows, in chronological order, (i) a classification result for each environmental sound category and (ii) a change of each category occupancy in units of time sections in Embodiment 3.

FIG. 14 schematically shows Embodiment 3. The upper part of FIG. 14 shows a classification result for each environmental sound category. The lower part of FIG. 14 shows a change of each category occupancy over time in units of time sections. The horizontal axis in FIG. 14 is a time axis. The bus, train, voice, indoors, and outdoors in FIG. 14 indicate environmental sound categories, respectively.

The specific example of Embodiment 3 is different from that of Embodiment 1, since a judgment of environment is performed in the user active section where the user is judged to be moving. In FIG. 14, a period between time points t11 and t12 indicates a period in which the user is moving. In the same manner, each of a period between time points t13 and t14 and a period between time points t15 and t16 indicates a period in which the user is moving. The sound analysis device 100b judges the environment based on the category occupancies in the judgment target section of each of these periods. Also, in a case where it is a period in which a movement of the user is detected and the category occupancies are changed beyond a predetermined threshold value in adjacent segments included in the period, which are a temporally preceding segment and a temporally succeeding segment, the sound analysis device 100b judges that the boundary between the adjacent segments is the breakpoint of the environmental change.

As described above, according to the present embodiment, when it is a period in which a movement of the user is detected and the category occupancies are changed beyond the predetermined threshold value in adjacent segments included in the period, which are a temporally preceding segment and a temporally succeeding segment, the boundary between the adjacent segments is judged to be the breakpoint of the environmental change. This makes it possible to accurately detect the breakpoint of an environmental change. Also, in the user inactive section, which is a section other than the user active section, a result of classification is not read. In other words, in the user inactive section, neither the calculation of the category occupancies nor a judgment of environment is performed. This makes it possible to improve the calculation efficiency.

Embodiment 4

The present embodiment specializes in an environment judgment related to transportation.

<Structure of Sound Analysis Device 100c>

Figure 15:
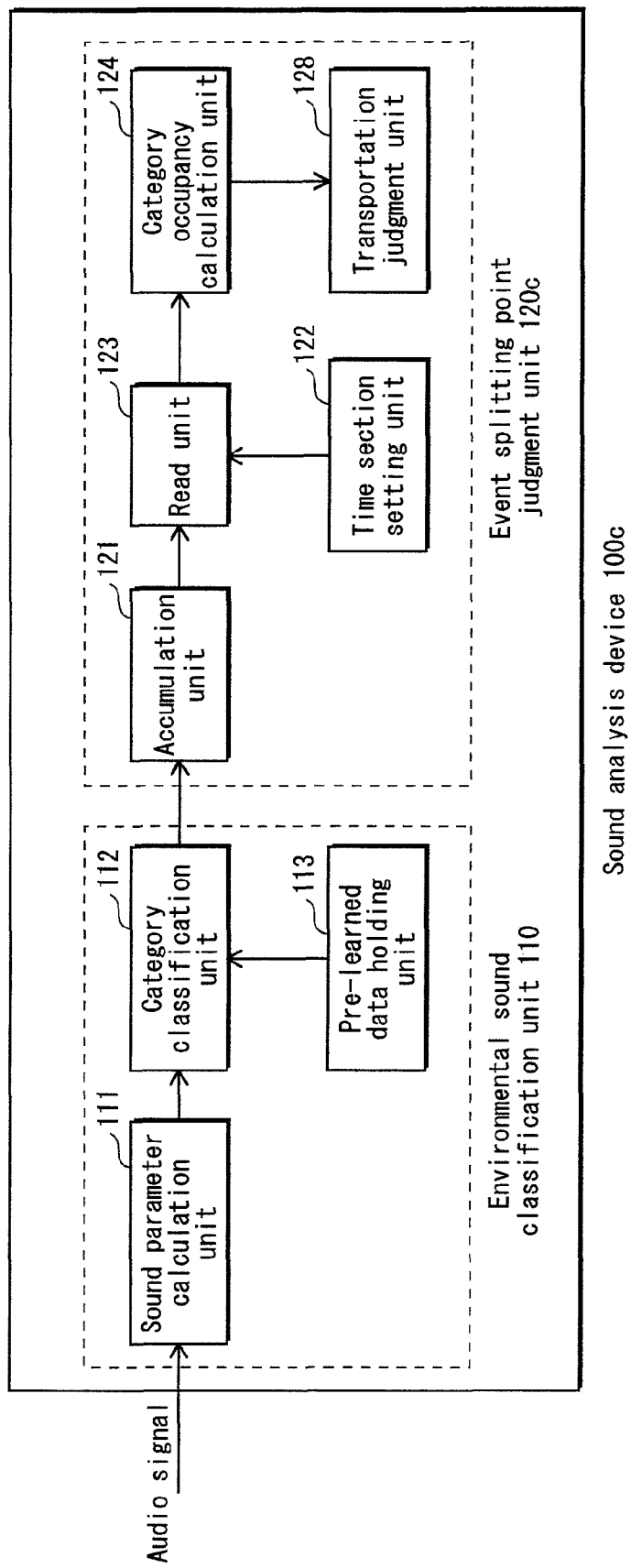
FIG. 15 is a functional block diagram of a sound analysis device 100c in Embodiment 4.

FIG. 15 is a functional block diagram of a sound analysis device 100c in the present embodiment. As shown in FIG. 15, the sound analysis device 100c includes a transportation judgment unit 128, instead of the environment judgment unit 125 in Embodiment 1. Also, in the present embodiment, the environmental sound classification unit 110 classifies the environmental sounds into categories (hereinafter referred to as "transportation") specialized in transportation. For example, such categories include walk, train, bus, car, bicycle, and elevator.

The pre-learned data holding unit 113 in the present embodiment holds various sounds as sound parameters so as to enable sound identification used for a judgment of transportation. For example, such sounds used as the sound parameters include (i) footsteps of a user when the user is walking, (ii) the sound of a motor or an engine when increasing/decreasing speed, when the user is on a train, on a bus, or in a car, (iii) the sound of wind or a spinning chain when the user is on a bicycle, and (iv) the quietness of an elevator when the user is on the elevator.

The transportation judgment unit 128 is basically the same as the environment judgment unit 125 in Embodiment 1. In other words, the transportation judgment unit 128 judges an environment based on the category occupancies in each judgment target section. Also, the transportation judgment unit 128 judges whether or not transportation is changed based on the rate of change of the category occupancies. If transportation is changed, the transportation judgment unit 128 sets the time point at which transportation is changed to the time point at which the environment is changed.

Note that, in a case where the environment is judged based on only the category occupancies, it is extremely difficult to judge, for example, whether or not the user is on an elevator. This is because it is difficult to distinguish the quietness of the elevator from the quietness inside a building. Therefore, the sound analysis device 100c may further include an electronic altimeter, so as to improve the accuracy of the judgment of the environment, and may judge whether or not the user is on an elevator based on the category occupancies and the altitudinal displacement.

As described above, according to the present embodiment, it is possible to judge the transportation that is being used, based on only the audio signal.

Embodiment 5

In the present embodiment, the transportation is not judged based on only the environmental sounds as seen in Embodiment 4. Instead, the transportation is judged based on the environmental sounds and the movement of the user.

<Structure of Sound Analysis Device 100d>

Figure 16:
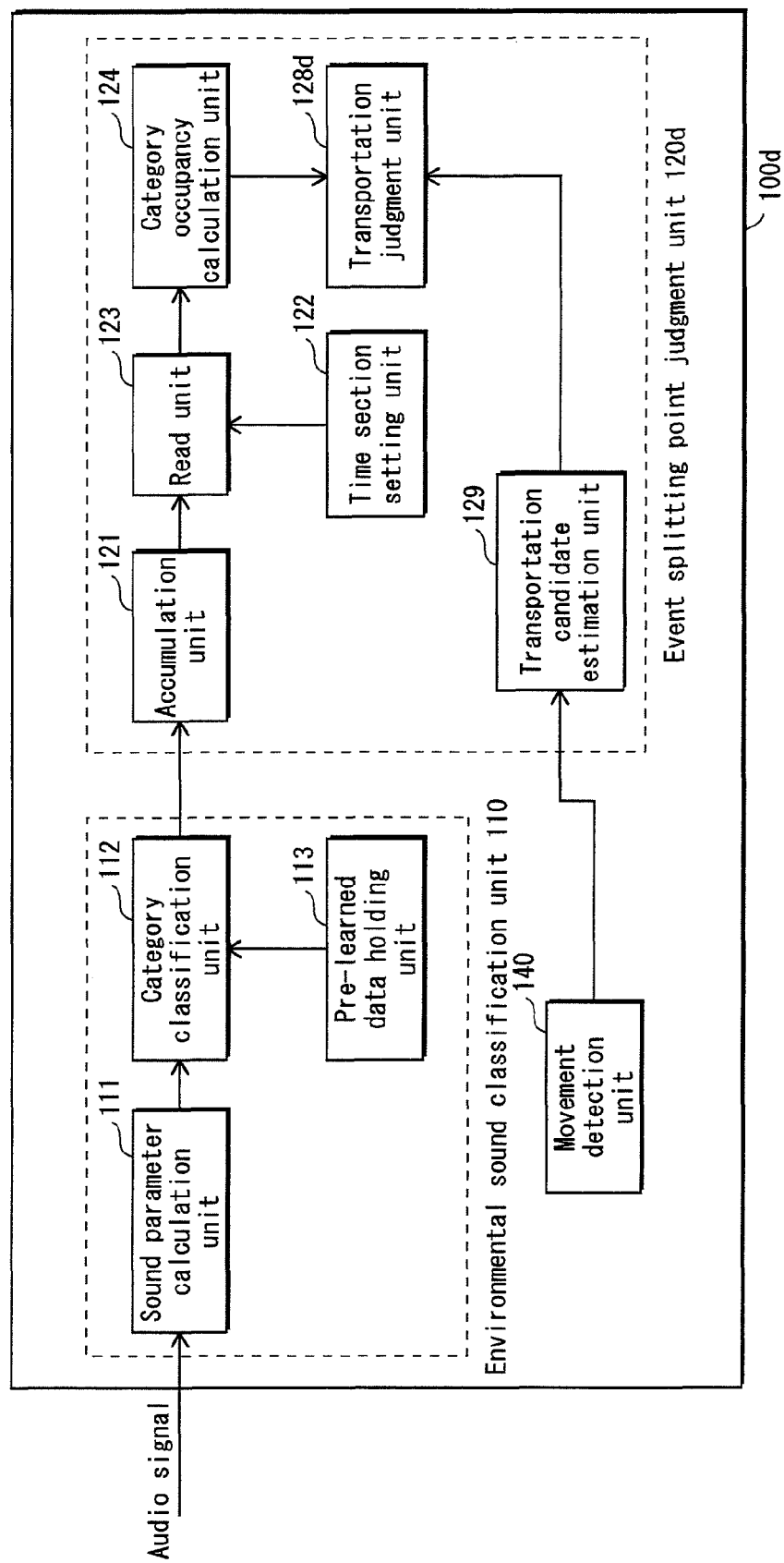
FIG. 16 is a functional block diagram of a sound analysis device 100d in Embodiment 5.

FIG. 16 is a functional block diagram of a sound analysis device 100d according to the present embodiment. As shown in FIG. 16, the sound analysis device 100d includes the movement detection unit 140, in addition to the components of the sound analysis device 100 in Embodiment 1. Also, an event splitting point judgment unit 120d in the sound analysis device 100d includes a transportation judgment unit 128d instead of the environment judgment unit 125, and further includes a transportation candidate estimation unit 129.

The transportation candidate estimation unit 129 selects at least one candidate for the transportation that is being used by a user of the sound analysis device 100d, based on acceleration information and altitude information input from the movement detection unit 140, and transmits the at least one candidate for the transportation to the transportation judgment unit 128d.

The transportation judgment unit 128d judges the transportation based on (i) the at least one candidate for the transportation that is input from the transportation candidate estimation unit 129 and (ii) the category occupancies that are input from the category occupancy calculation unit 124. Then, the transportation judgment unit 128d transmits the transportation information indicating the transportation that has been judged, to the recording unit 20 and the ringtone necessity judgment unit 30. Furthermore, the transportation judgment unit 128d judges whether or not transportation is changed. When transportation is changed, the transportation judgment unit 128d detects the time point at which transportation is changed as an environmental change time point that is a time point at which the environment is changed, and transmits the environmental change time point to the recording unit 20.

Specifically, for example, when transportation has the highest category occupancy among the category occupancies in a judgement target section and is selected as a transportation candidate in the judgment target section, the transportation unit judgment unit 128d determines the transportation to be the environment in the judgment target section. Also, when the category occupancies are changed beyond a predetermined threshold value between a preceding judgment target section and a succeeding judgment target section and the transportation candidates are changed, the transportation judgment unit 128d judges that the start point of the preceding judgment target section is the breakpoint of change in transportation. Note that the transportation candidates may be used only for detection of a time point at which the environment is changed, and judgment of transportation in each judgement target section may be performed based on only the category occupancies.

<Selection of Transportation Candidate>

Figure 17:
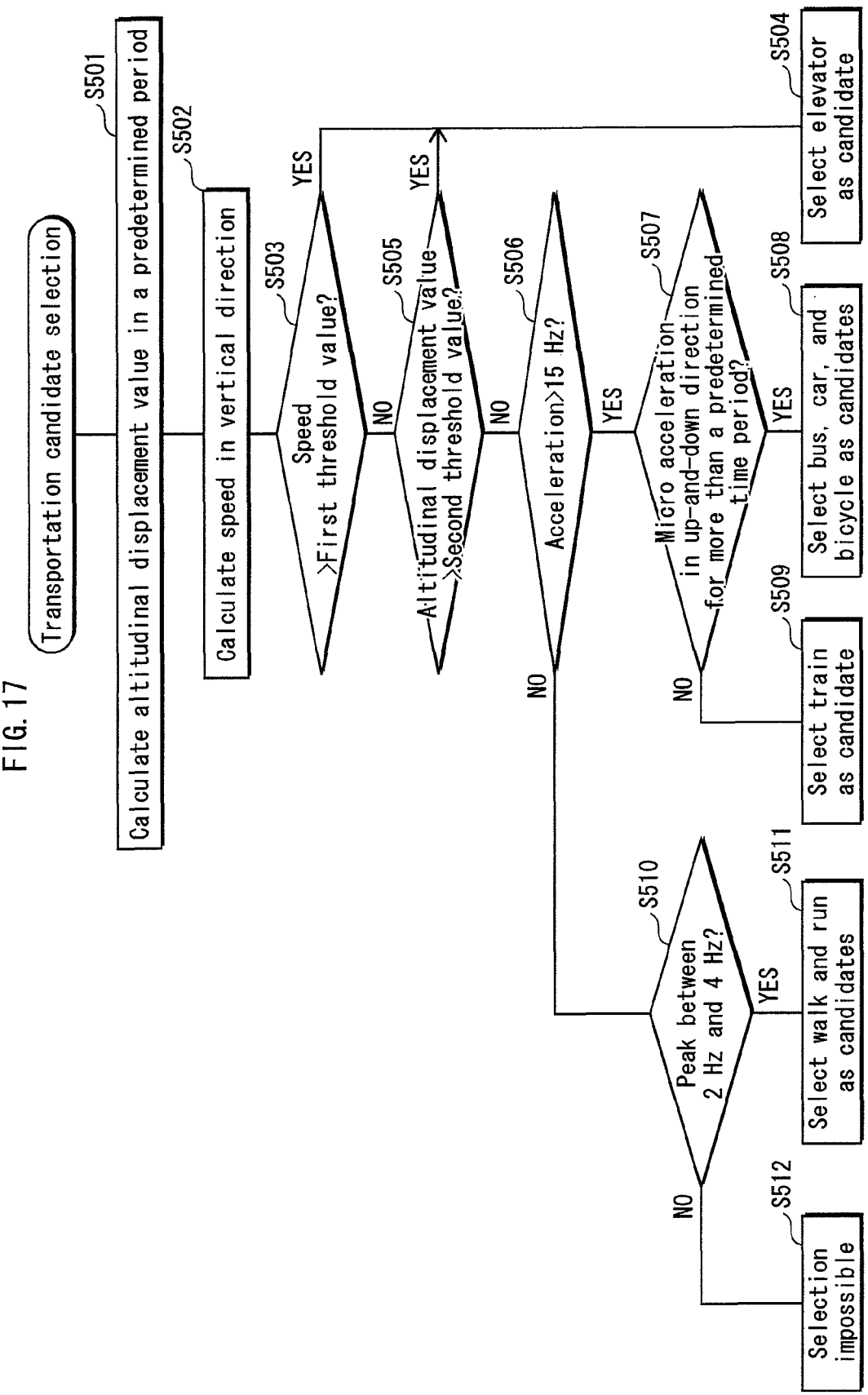
FIG. 17 is a flowchart showing a process for selecting transportation candidates.

FIG. 17 is a flowchart showing a process for selecting transportation candidates. The transportation candidate estimation unit 129 first calculates, from the altitude information, an altitudinal displacement value in a predetermined period (step S501), and then calculates, from the predetermined period and the altitudinal displacement value, speed in a vertical direction (step S502). The transportation candidate estimation unit 129 stores a first threshold value and a second threshold value in advance. The transportation candidate estimation unit 129 compares the first threshold value to the speed in the vertical direction, thereby judging whether or not the speed in the vertical direction is larger than the first threshold value (step S503), and also compares the second threshold value to the altitudinal displacement value, thereby judging whether or not the altitudinal displacement value is larger than the second threshold value (step S505). When the speed in the vertical direction is larger than the first threshold value (Yes in step S503), or when the altitudinal displacement value is larger than the second threshold value (Yes in step S505), the transportation candidate estimation unit 129 selects an elevator as a candidate for transportation (step S504).

When the speed in the vertical direction is smaller than or equal to the first threshold value (No in step S503), and when the altitudinal displacement value is smaller than or equal to the second threshold value (No in step S505), the transportation candidate estimation unit 129 judges, for example, whether or not the triaxial acceleration sensor has detected an acceleration value larger than 15 Hz (step S506). When an acceleration value larger than 15 Hz has been detected (Yes in step S506), the transportation candidate estimation unit 129 selects at least one of a bus, a car, a train, and a bicycle as a candidate for transportation. In particular, since micro acceleration in an up-and-down direction is frequently seen in a bus, a car, and a bicycle, the moving and stopping of each of the bus, the car, and the bicycle is relatively detectable by tracking the average value of the power spectrum in a direction of time. Therefore, the transportation candidate estimation unit 129 judges whether or not micro acceleration in the up-and-down direction is detected for more than a predetermined period of time (step S507). When micro acceleration in the up-and-down direction has been detected for more than the predetermined period of time (Yes in step S507), the transportation candidate estimation unit 129 selects a bus, a car, and a bicycle as candidates for transportation (step S508).

When micro acceleration in the up-and-down direction has not been detected for more than the predetermined period of time (No in step S507), a train is selected as a candidate for transportation (step S509).

As described above, it is possible to distinguish a bus, a car, and a bicycle from a train based on the movement and the stop frequency.

As for walk and run, a characteristic peak appears in the range of 2 Hz to 4 Hz. Therefore, it is possible to distinguish walk and run from other transportation means by detecting this characteristic peak. Accordingly, when an acceleration value is smaller than or equal to 15 Hz (No in step S506), the transportation candidate estimation unit 129 judges whether or not the characteristic peak appears in the range of 2 Hz to 4 Hz (step S510). When the characteristic peak is detected in the range of 2 Hz to 4 Hz (Yes in step S510), the transportation candidate estimation unit 129 selects walk and run as candidates for transportation (step S511). When the characteristic peak is not detected in the range of 2 Hz to 4 Hz (No in step S510), the transportation candidate estimation unit 129 judges that selecting candidates is impossible (step S512).

The transportation candidate estimation unit 129 outputs, to the transportation judgment unit 128*d*, some of the transportation means selected in the above-described manner as transportation candidates.

Also, the transportation candidate estimation unit 129 may set a time point at which transportation is selected in the above-described manner to the start point of the transportation, and set a time point at which the transportation is no longer selected to the endpoint of the transportation, thereby storing therein the start point and the end point.

<Operation of Sound Analysis Device 100*d*>

Figure 18:
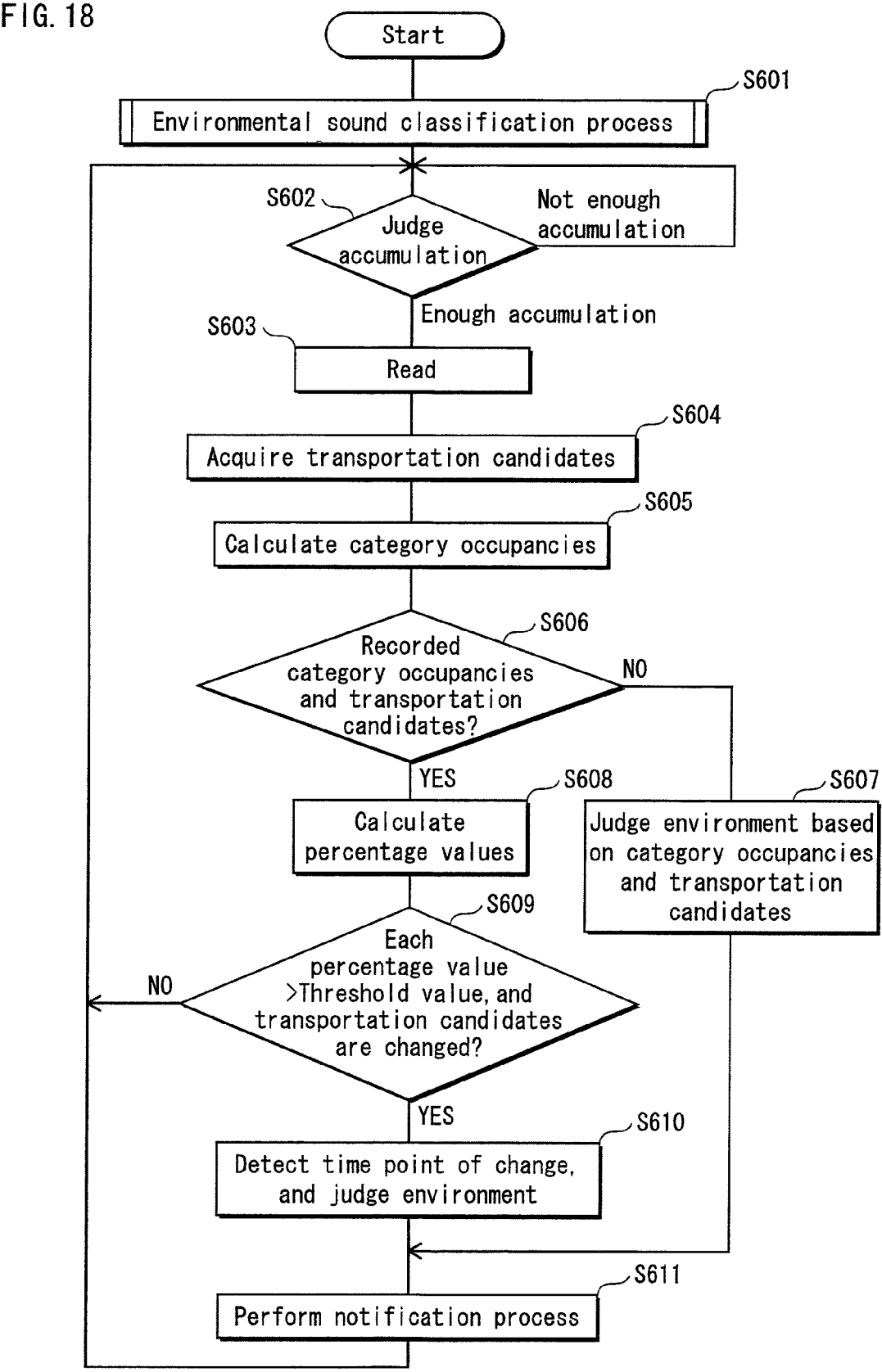
FIG. 18 is a flowchart showing the process steps of the sound analysis device 100d.

FIG. 18 is a flowchart showing process steps of the sound analysis device 100*d*. A process for classifying environmental sounds shown in step S601 is the same as the environmental sound classification process shown in FIG. 4. The flowchart of FIG. 18 is different from that of FIG. 4 with respect to the following four points. The first difference is that the transportation judgement unit 128*d* acquires candidates for transportation (step S604). The second difference is that the transportation judgment unit 128*d* judges whether or not the category occupancies and candidates for transportation have been already stored (step S606). The third difference is that the environment is judged based on the category occupancies and the candidates for transportation in a case where a result of the judgment in step S606 is in the negative (step S607). The fourth difference is that the transportation judgment unit 128*d* judges whether or not each percentage value is larger than a threshold value and whether or not the candidates for transportation are changed (step S609).

As described above, according to the present embodiment, detection of a time point at which transportation is changed is performed with use of at least one candidate for transportation and a result of the classification of the environmental sounds. Therefore, it is possible to improve the accuracy of detecting a boundary between environmental changes.

Embodiment 6

Figure 19:
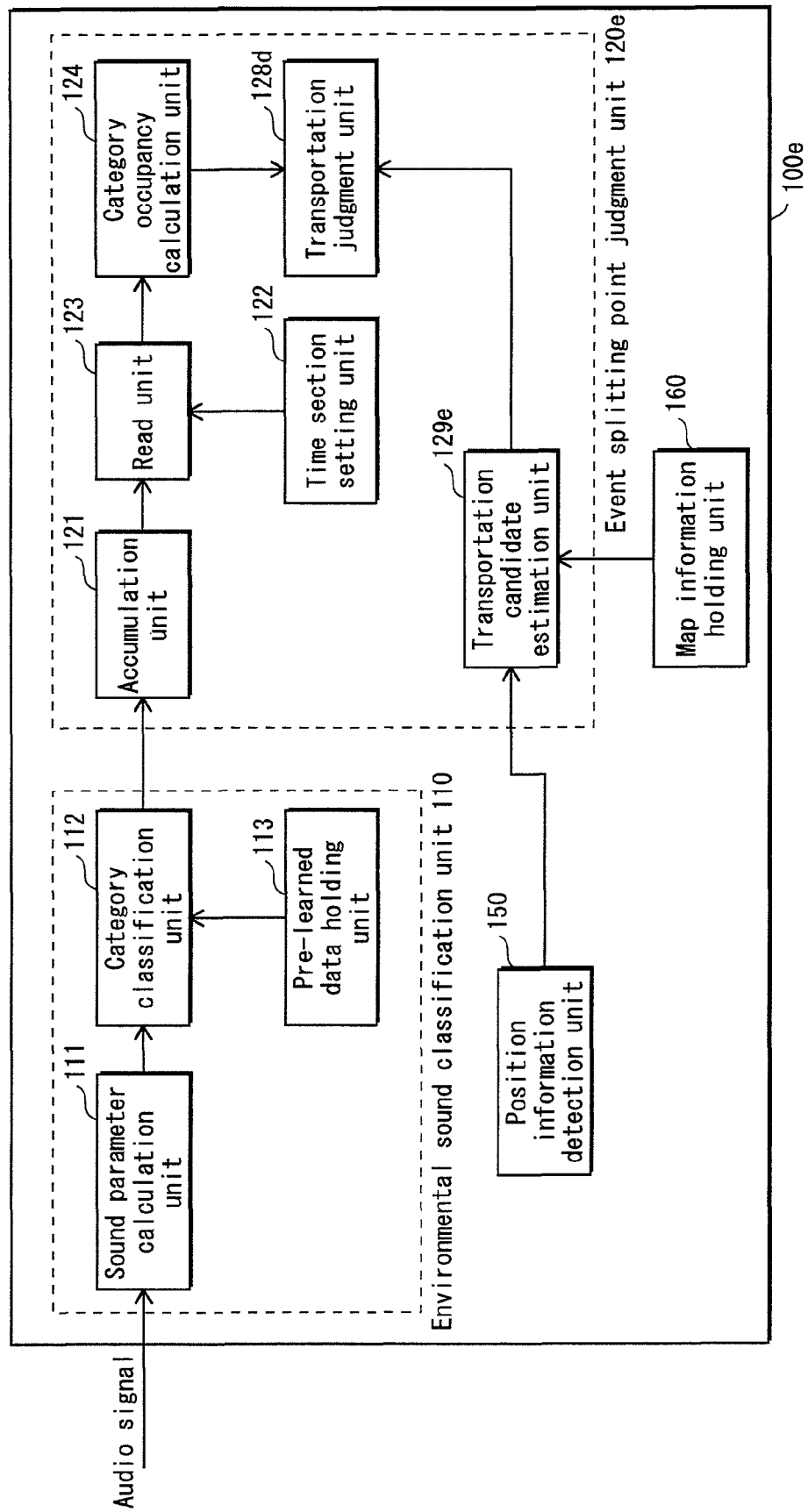
FIG. 19 is a functional block diagram of a sound analysis device 100e in Embodiment 6.

The following describes a sound analysis device according to the present embodiment, with reference to FIG. 19.

<Structure of Sound Analysis Device 100*e*>

FIG. 19 shows one example of the structure of a sound analysis device 100*e* according to the present embodiment. The sound analysis device 100*e* includes a position information detection unit 150 and a map information holding unit 160, in addition to the components of the sound analysis device 100 in Embodiment 1. Also, an event splitting point judgment unit 120*e* in the sound analysis device 100*e* includes a transportation judgment unit 128*e* instead of the environment judgment unit 125 in the sound analysis device 100, and further includes a transportation candidate estimation unit 129*e*.

Specifically, the position information detection unit 150 includes a GPS (Global Positioning System), etc., thereby detecting position information of one of a user and the sound analysis device 100*e*. Then, the position information detection unit 150 outputs the detected position information to the transportation candidate estimation unit 129*e*.

The map information holding unit 160 holds map information. In particular, the map information holding unit 160 holds route information and road information related to public transport (e.g., trains and buses).

The transportation candidate estimation unit 129*e* calculates a moving route of one of the user and the sound analysis device 100*e*, based on the position information of one of the user and the sound analysis device 100*e* for each predetermined time period, the position information being input from the position information detection unit 150. The transportation candidate estimation unit 129*e* compares the moving route to the route information held by the map information holding unit 160, and thereby selects a candidate for transportation. Then, the transportation candidate estimation unit 129*e* transmits, to the transportation judgment unit 128*d*, the candidate for transportation that has been selected.

For example, if the moving route of one of the user and the sound analysis device 100*e* is identical to the moving route of a train, the train is selected as a candidate for transportation. If the moving route of one of the user and the sound analysis device 100*e* is identical to the moving route of a bus, the bus is selected as a candidate for transportation. In other cases, walk, a bicycle, and a car are selected as candidates for transportation.

Components of the sound analysis device 100*e* that are other than those described above are the same as the components described in Embodiment 5.

As described above, according to the present embodiment, detection of a time point at which transportation is changed is performed with use of at least one candidate for transportation and a result of the classification of the environmental sounds. Therefore, it is possible to improve the accuracy of detecting a boundary between environmental changes.

Embodiment 7

Figure 20:
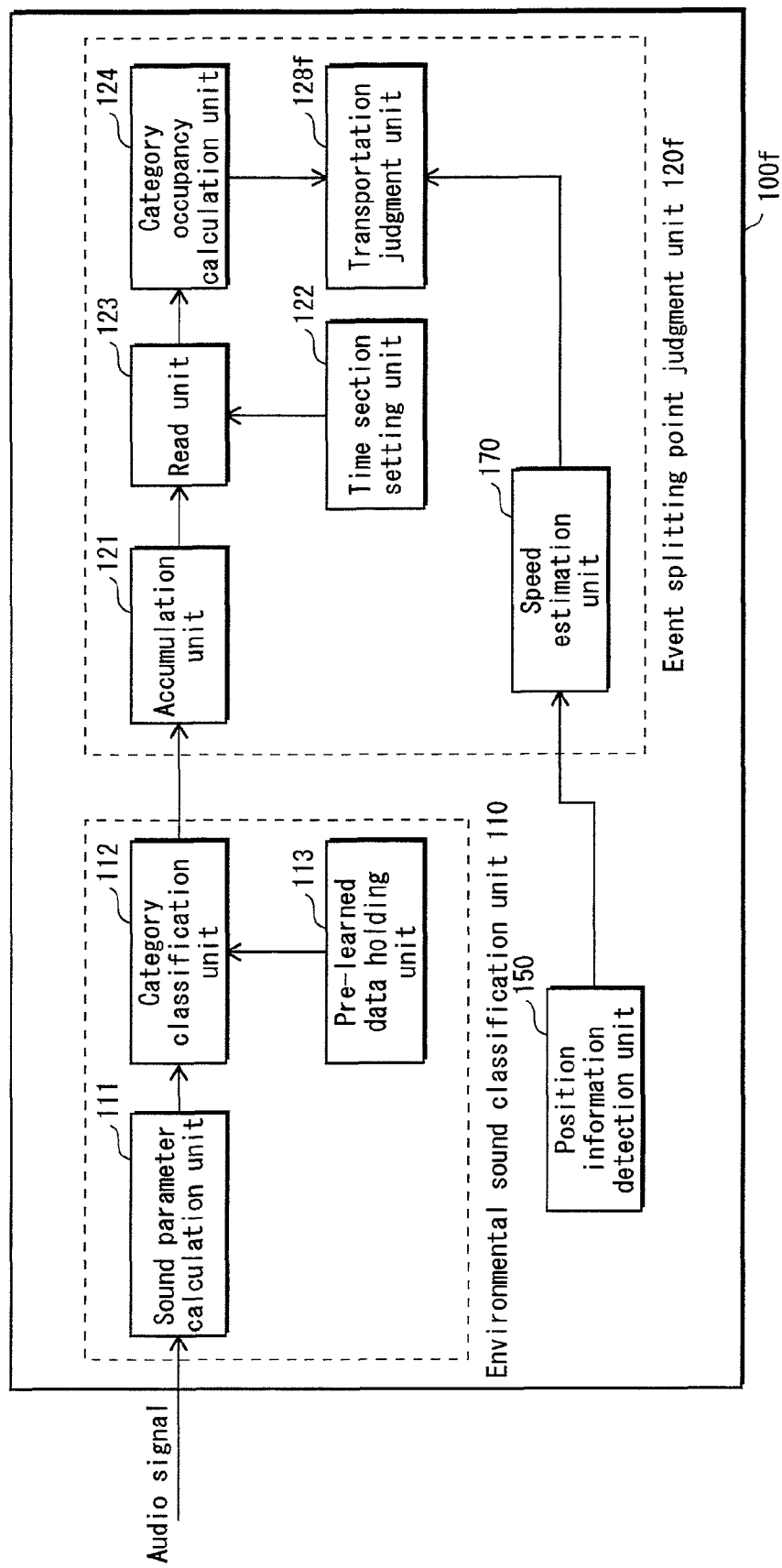
FIG. 20 is a functional block diagram of a sound analysis device 100f in Embodiment 7.

The following describes a sound analysis device according to the present embodiment, with reference to FIG. 20.

<Structure of Sound Analysis Device 100f>

FIG. 20 shows one example of the structure of a sound analysis device 100f according to the present embodiment. The sound analysis device 100f includes a speed estimation unit 170, instead of the transportation estimation unit 129e and the map information holding unit 160 of the sound analysis device 100e in Embodiment 6. The other components of the sound analysis device 100f are the same as those of the sound analysis device 100e of Embodiment 6.

The speed estimation unit 170 estimates the moving speed of one of the user and the sound analysis device 100f, based on the position information of one of the user and the sound analysis device 100f for each predetermined time period, the position information being input from the position information detection unit 150. Furthermore, the speed estimation unit 170 estimates transportation from the estimated moving speed, and transmits the estimated transportation to a transportation judgment unit 128f.

Specifically, provided that the position information is set in advance to be input every second, the position information (i.e., latitude information and longitude information) for each time point and Hubeny's distance calculation formula are used to calculate a distance between each two adjacent time points. This distance is equivalent to the moving distance for a unit of time, and thus directly approximates speed per second. Speed calculated in the above-described manner is used to calculate a moving period, a stopping period, maximum speed, etc., so as to estimate transportation.

The speed estimation unit 170 estimates that transportation being used is a train, if, for example, there are a moving period and a stopping period at least at several-minute intervals and a maximum speed that has been calculated exceeds 80 km/h. Then, the speed estimation unit 170 transmits, to the transportation judgment unit 128f, information indicating that the transportation is a train.

The speed estimation unit 170 estimates that the transportation is either a car or a bus if there are a moving period and a stopping period at shorter intervals and a maximum speed that has been calculated is smaller than or equal to 60 km/h. Also, the speed estimation unit 170 estimates that the transportation is walk if a maximum speed that has been calculated is smaller than or equal to 10 km/h.

The transportation judgment unit 128f judges transportation based on candidates for transportation that are input from the speed estimation unit 170 and category occupancies that are input from the category occupancy calculation unit 124. Then, the transportation judgment unit 128f transmits, to the recording unit 20 and the ringtone necessity judgment unit 30, transportation information indicating the transportation that has been judged. Furthermore, the transportation judgment unit 128f judges whether or not the transportation is changed. When judging that the transportation is changed, the transportation judgment unit 128f detects a time point at which the transportation is changed as a time point at which the environment is changed, and transmits, to the recording unit 20, the time point at which the environment is changed. With respect to the details of judgment of environment and a method for detecting a time point of change, the transportation judgment unit 128f performs the same process as the transportation judgment unit 128d.

As described above, according to the present embodiment, detection of a time point at which transportation is changed is performed with use of at least one candidate for transportation and a result of the classification of the environmental sounds. Therefore, it is possible to improve the accuracy of detecting a boundary between environmental changes.

Note that a method for estimating speed is not limited to a method used in the present embodiment.

Modification

The above describes a sound analysis device according to the present invention based on various embodiments, but the contents of the present invention are of course not limited to the above-described embodiments.

In the embodiments described above, the mobile telephone 1 automatically shifts to a manner mode depending on environment judged by the audio analysis device. However, the mobile telephone 1 may control incoming calls depending on the environment. In this case, the mobile telephone 1 includes an incoming call necessity judgment unit in place of the ringtone necessity judgment unit 30 and an incoming call suppression unit in place of the mode setting unit 40. The incoming call necessity judgment unit judges whether or not to receive an incoming call based on the environment information that is input from the sound analysis device 100, and transmits a result of the judgment to the incoming call suppression unit. The incoming call suppression unit suppresses incoming calls based on a result of judgment input from the incoming call necessity judgment unit. More specifically, if, for example, the environment information indicates a bus or a train, the incoming call necessity judgment unit judges that it is not necessary to receive incoming calls, and the incoming call suppression unit suppresses incoming calls. This makes it possible to prevent unnecessary incoming calls from being received depending on the situation of a recipient of the calls.

Also, the mobile telephone 1 may set the sound of buttons being pressed to be silent depending on the environment. In this case, the mobile telephone may include a judgment unit in place of the ringtone necessity judgment unit 30 and a button sound setting unit in place of the mode setting unit 40. The judgment unit judges whether or not the sound of the buttons being pressed to be silent, based on the environment information input from the sound analysis device, and transmits a result of the judgment to the button sound setting unit. The button sound setting unit changes the sound setting of the buttons to be silent, so that no sound is made when the buttons are pressed, based on a result of judgment input from the judgment unit. More specifically, for example, if the environment information indicates a bus or a train, the judgment unit judges that the sound of the buttons being pressed needs to be silent, and the button sound setting unit sets the sound of the buttons being pressed to be silent.

In the above-described embodiments, descriptions are provided on the premise that a mobile terminal is assumed to be a mobile telephone. However, it is possible to use, in place of the mobile telephone, a wearable terminal, a Manpo-kei™ (pedometer), a portable personal computer (hereinafter referred to as a portable PC), a digital still camera, a digital video camera, a hearing aid, etc.

Provided below is a description in a case where the mobile terminal is a wearable camera. A wearable camera is a device that can be attached to the chest position of a user, a leg of glasses of the user, etc., so that the images of the experience of the user are captured at all times and recorded in the wearable camera. By including the above-described sound analysis device in a wearable camera, it is possible to realize a function of, for example, detecting a change in the location of a worker in a factory and storing the change for record. Specifically, the wearable camera includes a judgment unit and an environmental change time recording unit. The judgment unit judges whether or not the environment is changed, based on the environment information input from the sound analysis device, and transmits a result of the judgment to the environmental change time recording unit. The environmental change time recording unit records the result of the judgment input from the judgment unit together with time. More specifically, if, for example, the environment information is changed from indoors to outdoors or from outdoors to indoors, the environmental change time recording unit records the time at which the environment is changed and the environment information at the time. The other components of the wearable camera are the same as those of the mobile telephone 1.

The following describes a case where the mobile terminal is a pedometer. A pedometer is worn, for example, on the position of the hips of a user, and is used to measure the number of steps of the user. By including the above-described sound analysis device in a pedometer, it is possible to achieve, for example, a function of classifying the forms of walking into a number of categories, based on when and in what kind of environment the user was walking. Specifically, a pedometer includes a walk environment acquisition unit and a walk environment recording unit. The walk environment acquisition unit acquires environment information indicating an environment in which a user is walking based on environment information input from the sound analysis device. The walk environment recording unit records the environment information input from the walk environment acquisition unit together with time and the number of steps. The other components of the pedometer are the same as those of the mobile telephone 1. This makes it possible to judge, for example, whether the user is walking outside to/from everyday work or the user is walking inside his/her office building during work, resulting in helping the user of the pedometer in health control.

The following describes a case where the mobile terminal is a camera. A digital still camera (including a still-image capturing function of a mobile telephone and the like) records a still image together with sounds that are heard around the time the still image is captured. A digital video camera (including a video recording function of a mobile telephone and the like) records both moving images and sounds. Each of the digital still camera and the digital video camera can automatically classify scenes that have been captured by recording the scenes with the atmosphere of the scenes as metadata. Specifically, each of the digital still camera and the digital video camera includes a dominant environmental sound judgment unit and a dominant environmental sound recording unit. The dominant environmental sound judgment unit tallies judgment results of environment that have been successively input from the environment judgment unit 125, and judges a dominant environmental sound in a predetermined section. The dominant environmental sound recording unit records information indicating the dominant environmental sound input from the dominant environmental sound judgment unit by associating the information with (i) sounds that have been recorded by the camera and (ii) image signals. For example, in a scene that has been captured for 20 seconds, the environmental judgment unit 125 inputs 20 judgment results to the dominant environmental sound judgment unit in chronological order. For example, the judgment results are assumed to be input every second. Provided that the bustling sound outside is determined to be dominant from the judgment results (e.g., a sound being determined to be dominant if the occupancy of the sound is more than a predetermined rate, such as when the occupancy is greater than or equal to 70% in 20 seconds), the captured scene is provided with a label of "bustling sound outside" as atmosphere information.

This allows captured scenes to be classified by atmosphere information, enabling the user to easily recall the scenes at a later time. Note that a method for judging whether or not an environmental sound is dominant is not limited to the above-described method. Instead, it is possible to determine that a sound classified as an environmental sound most in a captured scene is a dominant environmental sound.

The following describes a case where the mobile terminal is a hearing aid. Specifically, a hearing aid includes a method selection unit and a processing unit. The method selection unit selects a hearing aid method depending on a judgment result of environment input from the environment judgment unit 125. The processing unit performs hearing aid processing in accordance with the selected hearing aid method. The clarity of the hearing aid can be greatly improved by changing signal processing for aiding hearing in accordance with the environment of sound. For example, when a user of the hearing aid is surrounded by a bustling noise in a crowded building, the high and mid range of a frequency is raised to the extent that does not cause discomfort to the user, and when the user is surrounded by a traffic noise outside, the low range of the frequency is raised to the extent that does not cause discomfort to the user.

The following describes a case where the mobile terminal is a portable PC. Specifically, when the mobile terminal is a portable PC, all or part of the components of the mobile telephone and the camera may be implemented in software that operates on the computer, or in an external device such as a PC card or a USB external device, so as to realize, on the PC, the above-described functions of the mobile telephone and the camera.

In the above-described embodiments, the environmental sound classification unit 110 is specifically realized by a DSP, etc. However, the environmental sound classification unit 110 may be realized by a microprocessor. Also, in the above-described embodiments, the event splitting point judgment unit 120 is specifically realized by a microprocessor, etc. However, the event splitting point judgment unit 120 may be realized by a DSP.

In the above-described embodiments, the time sections are set so as to partially overlap each other. However, the time sections may be set without overlapping each other.

In Embodiment 6, the position information detection unit 150 includes a GPS, etc. However, the position information detection unit 150 may be a position information system in which PHS broadcasting or television broadcasting is used.

In the above-described embodiments, when the percentage value is judged to be larger than the threshold value, the start point of a time section corresponding to newly received category occupancies is detected as a time point at which the environment is changed. However, it is not limited to such. For example, the endpoint of a time section corresponding to recorded category occupancies may be detected as a time point at which the environment is changed, or a time point at which each of the category occupancies changes by exceeding a predetermined threshold value may be judged to be the breakpoint of an environmental change and detected as a time point at which the environment is changed.

In the above-described embodiments, the time point of an environmental change is detected when the percentage value changes by exceeding the threshold value. However, the time point of an environmental change may be detected when the category occupancy of one of the environmental sound categories exceeds a predetermined threshold value (e.g., when the category occupancy of a bus exceeds 90%).

Figure 21:
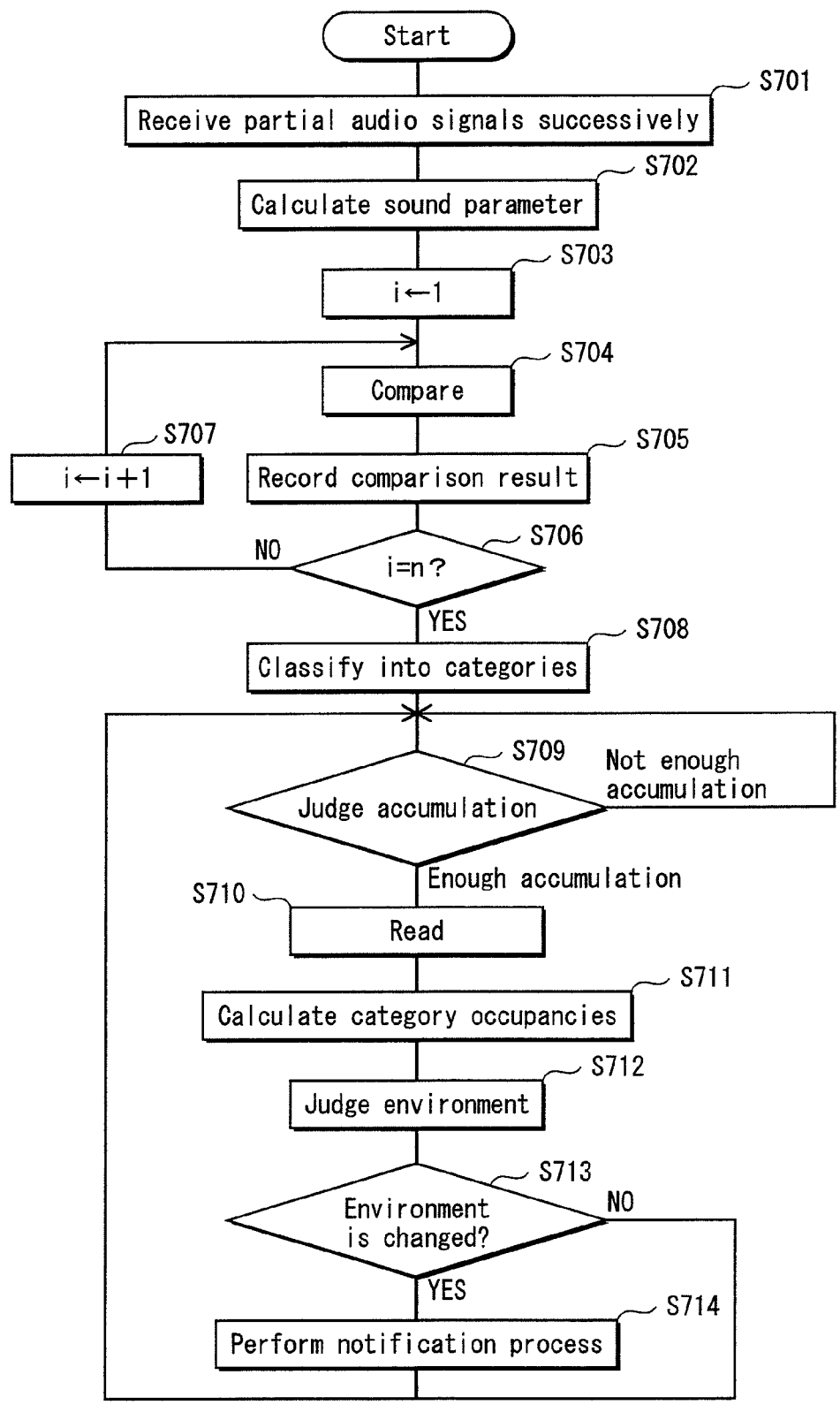
FIG. 21 is a flowchart of judgment of an environment in the case of not using a percentage value.

In the above-described embodiments, an environment is judged by determining whether or not the percentage value is larger than the threshold value. However, the percentage value does not always need to be calculated. Instead, an environment may be judged based on the category occupancies of the environmental sound categories in each time section. In this case, for example, the environment judgment unit 125 may judge an environment by receiving the category occupancies transmitted from the category occupancy calculation unit 124, and determining an environmental sound category having the highest occupancy among the category occupancies that have been received. FIG. 21 is a flowchart of environment judgment in the case of not using the percentage value. The process of steps S701-S711 is the same process as that of steps S101-S111 in FIG. 4. In step S712, an environment is judged based on the calculated category occupancies. In step S713, a judgment is made as to whether the judged environment has been changed. When the environment has been changed, the judged environment is transmitted to the recording unit 20 and the ringtone necessity judgment unit 30 (step S714). The process shown in FIG. 21 is different from the process shown in FIG. 4 with respect to steps S712, S713, and S714.

Also, it is not always necessary to calculate category occupancies. Instead, an environment may be judged by counting, for each of the environmental sound categories, the number of times each environmental sound category has been detected in a judgment target section. For example, an environment may be judged by determining an environmental sound category that has been detected most frequently in the judgment target section.

In the above-described embodiments, the mobile telephone 1 records environment information and time. However, the mobile telephone 1 may also automatically create a diary for a user to remember where he/she was and what he/she was doing at what time or a travel report or the like, based on the environment information and time. Also, a situation of the user may be estimated in real time based on the environment information and time, and a navigation service may be offered in accordance with the situation.

Although the above-described embodiments describe the sound analysis device, the present invention may be a method including the steps shown by the above-described flowcharts, a program including program codes that cause a computer to perform the steps shown by the above-described flowcharts, or an integrated circuit such as a system LSI. The system LSI may be referred to as an IC, an LSI, a super LSI or an ultra LSI in accordance with the degree of integration.

In addition, a method for integrating circuits is not limited to an LSI, and may be realized by a dedicated circuit or a versatile processor. It is possible to use an FPGA (Field Programmable Gate Array) that is programmable after the LSI is produced, or a reconfigurable processor that can restructure the connection and setting of circuit cells in the LSI.

In addition, if technology of integration that can substitute for LSIs appears by a progress of semiconductor technology or another derivational technology, it is possible to integrate function blocks by using the technology. A possible field for integrating the function blocks can be an adaptation of biotechnology.

INDUSTRIAL APPLICABILITY

A sound analysis device according to the present invention is advantageous as a sound analysis device that is mainly used in a mobile terminal, etc. The mobile terminal described here is a wearable camera, a pedometer, a portable PC (Personal Computer), a mobile telephone, a digital still camera, a digital video camera, a hearing aid, or the like.

The invention claimed is:

1. A sound analysis device comprising:
   a sound parameter calculation unit operable to acquire an audio signal and calculate a sound parameter for each of partial audio signals, the partial audio signals each being the acquired audio signal in a unit of time;
   a category determination unit operable to determine, from among a plurality of environmental sound categories, which environmental sound category each of the partial audio signals belongs to, based on a corresponding one of the calculated sound parameters;
   a section setting unit operable to sequentially set target sections on a time axis as time elapses, each of the judgment target sections including two or more of the units of time, the two or more of the units of time being consecutive; and
   an environment judgment unit operable to judge, based on a number of partial audio signals in each environmental sound category determined in at least a most recent judgment target section, an environment that surrounds the sound analysis device in at least the most recent judgment target section,
   wherein the environment judgment unit includes a calculation unit operable to calculate, for each of the judgment target sections, category occupancies each indicating a percentage of occupancy of a different one of environmental sound categories in the judgment target section, and
   wherein the judgment of the environment based on the number of partial audio signals in each environmental sound category determined in at least the most recent judgment target section is performed by determining whether or not a rate of change between (i) category occupancies in the most recent judgment target section and (ii) category occupancies in a preceding judgment target section is greater than a predetermined threshold value.

2. The sound analysis device of claim 1
   wherein the environment judgment unit includes a calculation unit operable to calculate category occupancies based on a number of partial audio signals in each environmental sound category determined in the most recent judgment target section, each of the category occupancies indicating a percentage of occupancy of a different one of the environmental sound categories in the most recent judgment target section, and
   wherein the judgment of the environment based on the number of partial audio signals in each environmental sound category determined in the most recent judgment target section is performed by determining an environmental sound category having a highest category occupancy among the category occupancies.

3. The sound analysis device of claim 1, further comprising:
   a power spectrum calculation unit operable to calculate a power spectrum of the audio signal; and
   a displacement judgment unit operable to detect temporal displacement of the power spectrum calculated by the power spectrum calculation unit and judge whether or not a value of the detected temporal displacement is greater than a predetermined threshold value, wherein the section setting unit sets the judgment target sections such that (i) a first time point at which the displacement judgment unit has judged affirmatively is an end point of a preceding judgment target section as well as a start point of the most recent judgment target section and (ii) a second time point at which the displacement judgment unit judges affirmatively next is an end point of the most recent judgment target section as well as a start point of a judgment target section subsequent to the most recent judgment target section.

4. The sound analysis device of claim 1 wherein the preceding judgment target section and the most recent judgment target section that are set by the section setting unit partially overlap each other, and wherein the environment judgment unit further detects, when the rate of change is greater than the predetermined threshold value, a predetermined time point of either the most recent judgment target section or the preceding judgment target section, and sets the predetermined time point as a time point at which the environment is changed.

5. The sound analysis device of claim 1, further comprising:

a movement detection unit operable to detect movement information indicating a movement of a user of the sound analysis device;

a movement judgment unit operable to judge whether or not the user is moving based on the movement information; and a control unit operable to prevent the environment judgment unit from judging the environment when the movement judgment unit judges negatively, and permit the environment judgment unit to judge the environment when the movement judgment unit judges affirmatively.

6. The sound analysis device of claim 4 wherein each of the environmental sound categories is related to transportation, wherein the sound analysis device further comprises:

a movement detection unit operable to detect movement information indicating a movement of a user of the sound analysis device; and a selection unit operable to select, from among the plurality of environmental sound categories, at least one environmental sound category as a candidate for transportation of the user, based on the movement information detected by the movement detection unit, and wherein in a case where the at least one environmental sound category selected by the selection unit is changed between the most recent judgment target section and the preceding judgment target section, the environment judgment unit further detects the predetermined time point as the time point at which the environment is changed.

7. The sound analysis device of claim 4 wherein each of the environmental sound categories is related to transportation, wherein the sound analysis device further comprises:

a position information detection unit operable to detect position information indicating a position of a user of the sound analysis device;

a storage unit storing therein map information; and a selection unit operable to select, from among the plurality of environmental sound categories, at least one environmental sound category as a candidate for transportation of the user, based on the position information detected by the position information detection unit and the map information, and wherein in a case where the at least one environmental sound category selected by the selection unit is changed between the most recent judgment target section and the preceding judgment target section, the environment judgment unit further detects the predetermined time point as the time point at which the environment is changed.

8. The sound analysis device of claim 4 wherein each of the environmental sound categories is related to transportation, wherein the sound analysis device further comprises:

a position information detection unit operable to detect position information indicating a position of a user of the sound analysis device;

a speed estimation unit operable to estimate speed by acquiring the position information at predetermined intervals and calculating a distance between each two adjacent time points; and a selection unit operable to select, from among the plurality of environmental sound categories, at least one environmental sound category as a candidate for transportation of the user, based on the speed estimated by the speed estimation unit, and wherein in a case where the at least one environmental sound category selected by the selection unit is changed between the most recent judgment target section and the preceding judgment target section, the environment judgment unit further detects the predetermined time point as the time point at which the environment is changed.

9. The sound analysis device of claim 4 wherein each of the environmental sound categories is related to transportation, and the time point at which the environment is changed and that is detected by the environment judgment unit is a time point at which transportation of a user is changed.

10. A sound analysis method comprising the steps of:

acquiring an audio signal and calculating a sound parameter for each of partial audio signals, the partial audio signals each being the acquired audio signal in a unit of time;

determining, from among a plurality of environmental sound categories, which environmental sound category each of the partial audio signals belongs to, based on a corresponding one of the calculated sound parameters;

sequentially setting judgment target sections on a time axis as time elapses, each of the judgment target sections including two or more of the units of time, the two or more of the units of time being consecutive; and judging, based on a number of partial audio signals in each environmental sound category determined in at least a most recent judgment target section, an environment that surrounds the sound analysis device in at least the most recent judgment target section, wherein the step of judging includes a step of calculating, for each of the judgment target sections, category occupancies each indicating a percentage of occupancy of a different one of environmental sound categories in the judgment target section, and wherein the judgment of the environment based on the number of partial audio signals in each environmental sound category determined in at least the most recent judgment target section is performed by determining whether or not a rate of change between (i) category occupancies in the most recent judgment target section and (ii) category occupancies in a preceding judgment target section is greater than a predetermined threshold value.

11. A system integrated circuit provided in a sound analysis device comprising:

a sound parameter calculation unit operable to acquire an audio signal and calculate a sound parameter for each of partial audio signals, the partial audio signals each being the acquired audio signal in a unit of time;

a category determination unit operable to determine, from among a plurality of environmental sound categories, which environmental sound category each of the partial audio signals belongs to, based on a corresponding one of the calculated sound parameters;

a section setting unit operable to sequentially set judgment target sections on a time axis as time elapses, each of the judgment target sections including two or more of the units of time, the two or more of the units of time being consecutive; and an environment judgment unit operable to judge, based on a number of partial audio signals in each environmental sound category determined in at least a most recent judgment target section, an environment that surrounds the sound analysis device in at least the most recent judgment target section, wherein the environment judgment unit includes a calculation unit operable to calculate, for each of the judgment target sections, category occupancies each indicating a percentage of occupancy of a different one of environmental sound categories in the judgment target section, and wherein the judgment of the environment based on the number of partial audio signals in each environmental sound category determined in at least the most recent judgment target section is performed by determining whether or not a rate of change between (i) category occupancies in the most recent judgment target section and (ii) category occupancies in a preceding judgment target section is greater than a predetermined threshold value.

* * * * *